United States Patent
Meyers et al.

(10) Patent No.: US 11,257,346 B1
(45) Date of Patent: Feb. 22, 2022

(54) CONTEXTUAL RESPONSE TO MOTION-BASED EVENT

(71) Applicant: Amazon Technologies, Inc., Seattle, WA (US)

(72) Inventors: James Meyers, San Jose, CA (US); Mara Clair Segal, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 16/712,717

(22) Filed: Dec. 12, 2019

(51) Int. Cl.
*G08B 21/22* (2006.01)
*G08B 21/04* (2006.01)
*G06F 3/01* (2006.01)
*G06F 9/54* (2006.01)
*G08B 27/00* (2006.01)

(52) U.S. Cl.
CPC ............ *G08B 21/043* (2013.01); *G06F 3/011* (2013.01); *G06F 3/017* (2013.01); *G06F 9/542* (2013.01); *G08B 21/0438* (2013.01); *G08B 21/22* (2013.01); *G08B 27/005* (2013.01)

(58) Field of Classification Search
CPC .................................................. G08B 21/043
See application file for complete search history.

(56) References Cited

U.S. PATENT DOCUMENTS

| | | | |
|---|---|---|---|
| 2012/0154582 A1* | 6/2012 | Johnson | G16H 10/60 348/143 |
| 2016/0228040 A1* | 8/2016 | Atarashi | H04M 19/04 |
| 2017/0287313 A1* | 10/2017 | Park | A61B 5/00 |
| 2018/0325469 A1* | 11/2018 | Fountaine | A61B 5/747 |
| 2020/0293116 A1* | 9/2020 | Udall | G06F 3/167 |
| 2020/0329358 A1 | 10/2020 | Hamre et al. | |

\* cited by examiner

*Primary Examiner* — Joseph H Feild
*Assistant Examiner* — Pameshanand Mahase
(74) *Attorney, Agent, or Firm* — Lee & Hayes, P.C.

(57) ABSTRACT

Systems and methods for configuration for contextual response to motion-based events are disclosed. For example, a predefined event may be detected. The system may determine that a subject associated with the event is of a given type of subjects and may determine whether another person is present in the environment associated with the event to assist in providing aid. The presence of the other person may be detected, a type of the other person may be performed, and a notification may be output on a second device associated with the other person based on the type. The system may track when the other person reach an area associated with the event and may cause the first device to perform an action to assist the other person in providing aid.

20 Claims, 9 Drawing Sheets

600

```
┌─────────────────────────────────────────────────────────────────────┐
│ Determine, utilizing first data received from first device, that    │
│ predefined event has occurred, predefined event indicating that     │
│ first person has fallen, first data indicating environmental change │
│ as detected by first sensor of first device                         │
│                              602                                     │
└─────────────────────────────────────────────────────────────────────┘
                                  │
                                  ▼
┌─────────────────────────────────────────────────────────────────────┐
│ Determine, utilizing second data received from first device, that   │
│ first person is associated with first user profile indicating first │
│ person needs assistance when predefined event occurs                │
│                              604                                     │
└─────────────────────────────────────────────────────────────────────┘
                                  │
                                  ▼
┌─────────────────────────────────────────────────────────────────────┐
│ Determine, in response to determining that first person is          │
│ associated with first user profile and utilizing third data         │
│ received from second device, presence of second person associated   │
│ with environment of first person, third data indicating that second │
│ sensor of second device detected moving subject                     │
│                              606                                     │
└─────────────────────────────────────────────────────────────────────┘
                                  │
                                  ▼
┌─────────────────────────────────────────────────────────────────────┐
│ Send, to second device and in response to determining presence of   │
│ second person: fourth data representing notification that           │
│ predefined event has occurred; and first command to cause second    │
│ device to output notification                                        │
│                              608                                     │
└─────────────────────────────────────────────────────────────────────┘
```

```
┌─────────────────────────────────────────────────────────────────┐
│ Determine, based at least in part on first data received from   │
│ first device, that predefined event has occurred, first data    │
│ indicating environmental change as detected by first device     │
│ 702                                                             │
└─────────────────────────────────────────────────────────────────┘
                               │
                               ▼
┌─────────────────────────────────────────────────────────────────┐
│ Determine, based at least in part on second data received from  │
│ first device, that subject associated with predefined event is  │
│ associated with first user profile indicating user is to be     │
│ contacted when predefined event occurs                          │
│ 704                                                             │
└─────────────────────────────────────────────────────────────────┘
                               │
                               ▼
┌─────────────────────────────────────────────────────────────────┐
│ Determine, based at least in part on determining that subject   │
│ is associated with first user profile, presence of user         │
│ associated with environment of subject                          │
│ 706                                                             │
└─────────────────────────────────────────────────────────────────┘
                               │
                               ▼
┌─────────────────────────────────────────────────────────────────┐
│ Send, to at least one of user or second device associated with  │
│ user and based at least in part on determining presence of      │
│ user: third data representing notification that predefined      │
│ event has occurred; and first command to cause output of        │
│ notification                                                    │
│ 708                                                             │
└─────────────────────────────────────────────────────────────────┘
```

FIG. 7

CONTEXTUAL RESPONSE TO MOTION-BASED EVENT

BACKGROUND

Electronic devices can now be used to assist in user tasks and/or for communication purposes. Electronic devices designed to assist users in times of need can be life-saving and/or can be useful to caregivers. Described herein are improvements in technology and solutions to technical problems that can be used to, among other things, assist users in times of need and/or at other times.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example process for contextual response to motion-based events.

FIG. 7 illustrates a flow diagram of another example process for contextual response to motion-based events.

DETAILED DESCRIPTION

Figure 1:
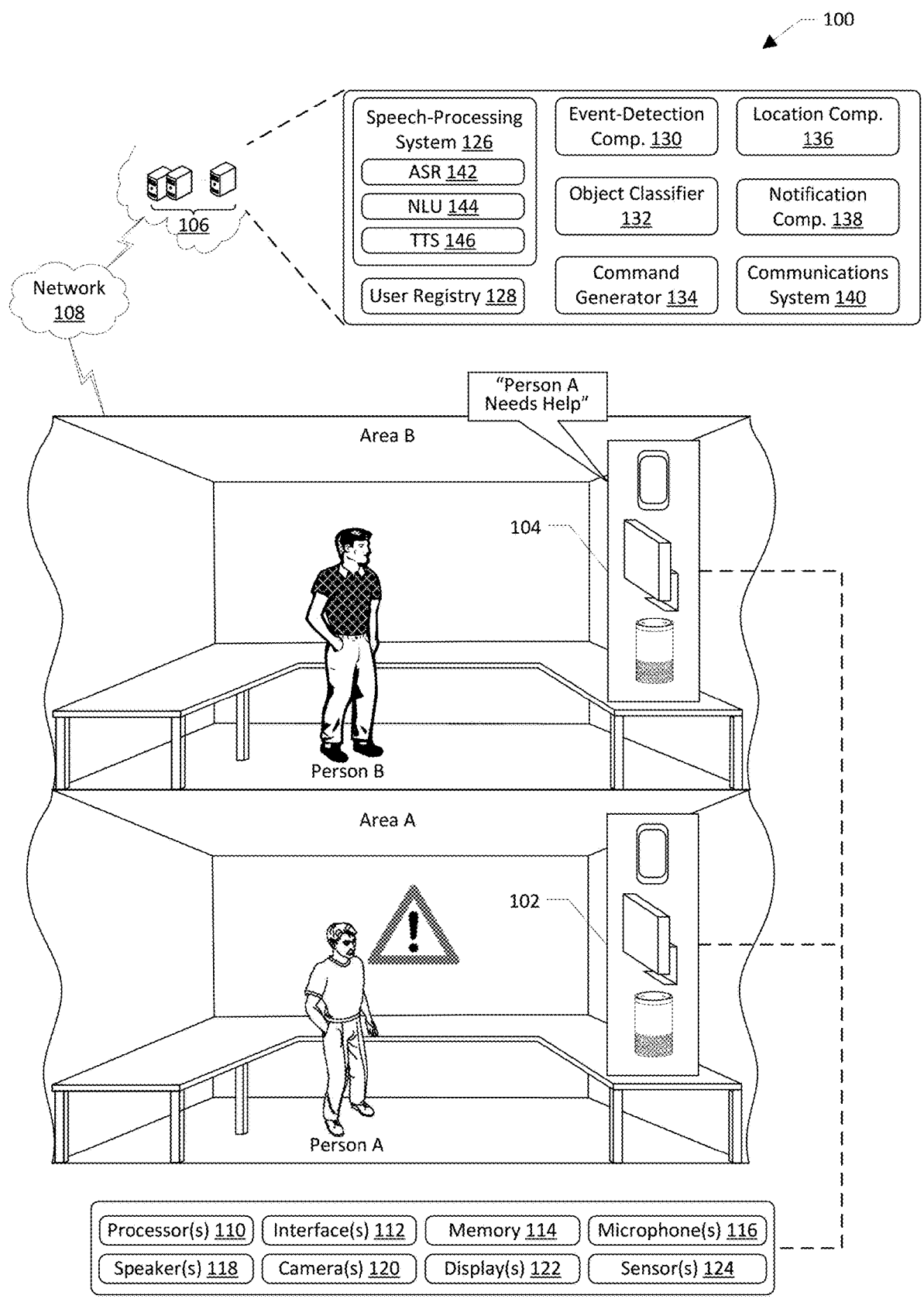
FIG. 1 illustrates a schematic diagram of an example environment for contextual response to motion-based events.

Systems and methods for configurations for contextual response to motion-based events are disclosed. Take, for example, an environment such as a home where one or more users reside. Such users may make intentional and unintentional noise while residing in the environment. Such intentional noises may include talking, footsteps, operation of appliances, contacting two or more objects together, etc. Example unintentional noises may include falling and/or noises made when a user is in need of assistance, such as medical assistance. Other noises such as glass breaking may also occur. In addition to noises, movement patterns may be associated with desired and undesired movements. Desired movements may include walking, exercising, etc. Undesired movements may include a dog jumping up on a table, a person slouching and/or falling, etc. Such users may desire to have a system included in their environment that can detect when certain unwanted or otherwise predefined events occur and take corrective actions. Such users may also desire the system to allow for detecting additional occupants of the environment or another related environment so that the additional occupants may be notified of the event and may lend aid.

The present innovation provides for a system that may be utilized to detect events, detect the presence of occupants, and send notifications to devices associated with those occupants to take corrective action. For example, an environment may include a first area that includes at least one electronic device. The electronic device may include sensors configured to receive electromagnetic waves at various bandwidths and/or bandwidth ranges. For example, a given device may include an ultra-wide band antenna configured to receive electromagnetic waves with a bandwidth at or around 6 GHz. The device may also include a millimeter-wave band antenna configured to receive electromagnetic waves with a bandwidth at or around 60 GHz. This dual-band radar functionality may be utilized to detect movement that is likely to correspond to a predefined event, such as a person falling. By utilizing dual-band radar functionality as described herein, the radar may be able to detect event occurrences in rooms or other types of spaces in both the room in which the sensing device is located and other, such as adjacent, rooms. For example, the electromagnetic waves may be received at the antennas and corresponding sensor data may be generated. The sensor data may be utilized by the device to determine if one or more predefined events have occurred. Event data indicating that the device has determined that a predefined event has occurred may be sent from the device to a remote system for event-detection confirmation processing. In other examples, the sensor data may be sent from the device to another device and/or system, such as a remote system configured to process the sensor data, to determine whether the one or more predefined events has occurred. In this way, detection of an event may include detection of a motion-based event utilizing one or more of the processes and/or sensors described herein.

The remote system, having received and/or generated the event data indicating that the predefined event has occurred may initiate a process for identifying other occupants associated with the environment. For example, contextual information associated with the subject associated with the event as well as contextual information associated with other subjects in the environment may be determined. For example, a subject classifier may be utilized to determine a type of the subject associated with the event. The subject classifier may utilize information provided by the device from which the sensor data was received, such as information indicating the size, shape, and/or identity of the subject to classify the subject into one or more predefined subject types. For example, one subject type may correspond to people that are less likely to be able to help themselves and may represent subjects with a size and/or shape that is likely to correspond to such a person. In certain examples, the information about the subject may be utilized to identify a user profile associated with the subject and that user profile may be utilized to classify the subject. In still other examples, additional information such as beacon data from a personal device associated with the subject may be utilized. For example, if the event is associated with a subject such as a person and that person has his/her personal device, the personal device may send data indicating that the personal device is present, such as by beaconing and/or short-range wireless connection, such as Bluetooth connection. The subject classifier may utilize some or all of this information to classify the subject associated with the event. If the subject is associated with a particular subject type, such as a person or animal that needs assistant (e.g., younger people/babies/toddlers/children, older people, people under medical supervision, pets, entry ways, porches, etc.), the system may determine that instead of or in addition to attempting to interact with the subject, such as by asking the subject (via a nearby device or the initial device) if the subject needs help or to confirm with the subject that the event occurred, the system may determine that an additional/different person (another occupant in the same building or otherwise nearby) should be identified and notified, such as by the nearby device, of the event so that the additional person can lend aid.

For example, during a setup process, the system and/or one or more users may define various subject types, associate user profiles and/or information about users and/or other types of subjects with subject types, associate notification types and/or modes with the types and/or event types, and/or associate actions for the system to take based on the types of the subject associated with the event and/or the types of additional occupants that are detected. The setup process may also include receiving user input indicating one or more devices and/or user profiles that, while not associated with the environment where an event is detected, may be utilized when an event is detected. For example, a user may indicate that a device associated with a neighbor should be notified of the event, such as in given circumstances where, for example, no "helper" is detected in the environment. Additional examples include establishing a communication channel with emergency personnel, with a device associated with a user profile of a "helper," etc. Configuration of notifications and actions taken when an event occurs may be performed utilizing user input and/or may be performed by the system, such as utilizing information about the devices and user profiles associated with given account data.

When an event is detected as described herein, one or more other electronic devices associated with the environment may be enabled and/or may be instructed to send sensor data and/or to determine whether another occupant is present. For example, an event-detection component may generate and send an event indicator to a command generator of the remote system. The event indicator may cause the command generator to generate a command to be sent to the one or more electronic devices associated with the environment. For example, the first device that sent the sensor data indicating the event occurred may be associated with account data. The account data may also indicate the other electronic devices associated with the account data. The command generator may utilize the account data to identify the other electronic devices and may send an instance of the command to enable sensors and/or to send sensor data and/or to detect presence to some or each of the electronic devices. For purposes of illustration, the device that determined the event occurred and/or that sent the sensor data utilized to determine the event occurred may be described as the "first device," while the other devices utilized to detect presence of another occupant may be described as the "second device(s)."

The second device(s) may receive the command from the command generator and may initiate a process of detecting the presence of the other occupant. For example, the second device(s) may have already had sensors enabled and may have been actively generating sensor data. In these examples, receipt of the command may cause the sensor data to be sent to the remote system and/or may cause the second device(s) to determine whether the sensor data indicates that presence is detected. In other examples, the second device(s) may have already determined that presence was detected and may send an indication that presence was detected to the remote system. In still other examples, the sensors of the second device(s) may not have been enabled and the command may cause the sensors to enable and to start generating sensor data. In addition to sending an indication that presence of an occupant has been sensed, the second device(s) may send additional data associated with the detected presence. For example, the additional data may include an indication of the size, shape, type, and/or identification of the occupant. It should be understood that while examples used herein illustrate the detection of a single additional occupant, this disclosure includes the detection of multiple additional occupants and/or subjects associated with a given environment. It should also be understood that while "occupant" is used to infer that the other subject is alive, this disclosure also includes the identification of subjects that are not alive.

The subject classifier may classify the additional occupant, such as by utilizing data sent from the second device(s). The data may include, for example, sensor data indicating a size, shape, and/or identity of the additional occupant and/or one or more devices associated with the additional occupant, such as a personal phone, watch, or other wearable device. In examples, the additional occupant may be associated with a "helper" subject type. In other examples, the additional occupant may be associated with a "non-helper" subject type, or other type such as "pet." The subject classifier may generate data indicating the determined subject type and/or identifier of the additional occupant and may provide that data to the command generator.

The command generator may then determine one or more commands to generate that, when executed, cause one or more devices associated with the environment to perform an action. For example, depending on the subject type of the additional occupant and/or the event type at issue, the command generator may generate a command to establish a communication channel between various devices, to send a notification to one or more devices, to cause one or more devices to change a configuration, to cause one or more lighting elements to emit light, etc. In examples where the additional occupant is associated with the "helper" type, the command generator may send an event indicator and/or the subject identifier and/or type data to a notification component. The notification component may generate a notification, which may be selected from multiple potential notifications based at least in part on the event type and/or the subject identifier and/or type. For example, the notification may indicate that the event has occurred, a location associated with the event, an identity of the subject involved in the event, etc. In certain examples, such as when the first device or another device in the area where the event occurred includes a camera, the notification may allow for a live or near-live video feed of the field of view of the camera to be transmitted to the second device(s). This may allow the additional occupant to see the area and determine if help is needed and/or what help may be needed. The notification may additionally, or alternatively, allow the user to establish a communication channel with the first device or another device in the area so that the additional occupant may speak with the individual involved in the incident. The notification may additionally, or alternatively, allow the user to establish a communication channel with one or more other devices, such as devices associated with emergency services. In other examples where the additional occupant is associated with a "non-helper" type, the notification may differ from the notification sent when the additional occupant is associated with the "helper" type. For example, instead of informing the additional occupant of a location of the event and prompting the additional occupant to lend assistance, the notification may tell the additional occupant to find a helper, call a helper, etc. Additionally, when no additional occupant is present and/or when the additional occupant is of a type deemed not capable or less capable of providing aid, the command generator may send a notification to a predefined device, such as a device associated with a neighbor user profile, a parent user profile, or other predesignated user profile.

In examples where a notification is to be sent to a device associated with the additional occupant, the notification may be sent to the command generator, which may send data representing the notification and a command to output the notification to the second device(s). The second device(s) that receive the data representing the notification may be selected based at least in part on which device sensed the presence of the additional occupant, which device is designated as a personal device associated with the additional occupant, and/or hardware configurations of the devices. For example, if the notification includes audio data, the selected second device(s) may be device(s) that include a speaker.

Thereafter, the additional occupant may move from her/his present location toward the area where the event occurred. The first device(s) may detect, utilizing the one or more sensors described herein, the location of the additional occupant and may send corresponding sensor data to a location component of the remote system. The location component may determine when a location of the additional occupant satisfies a threshold distance from a location of the event and may send an indication that the additional occupant is near the event to the command generator. Alternatively, the first device(s) may detect the presence of the additional occupant and may perform the location-related operations described above.

The command generator may then determine one or more actions to be taken based at least in part on the additional occupant having moved to the area where the event occurred. The actions may include causing the first device or another device to output audio and/or display images requesting confirmation that the event occurred, asking if help is needed, etc. Additional actions may be establishing a communication channel with another device, such as a device associated with emergency services. The command generator may generate and send a command to perform the action to the first device or another device. In examples where the action includes establishing a communication channel, the command generator may send a request to establish a communication channel to a communications system. The communications system may determine the device identifier of the first device(s) as well as the device identifier of the device to which the communication channel is to be established and may utilize these device identifiers to establish the communication channel. In examples where the subject is a non-human subject, the actions may include actions associated with such a subject. For example, when the subject is a package, such as a package delivered to a front porch of an environment, the actions may include the sending of notifications to one or more devices, unlocking of a door, turning on lights associated with the environment, etc. Utilizing the package example, the package may include one or more markings that may be detected and utilized to determine an action to take. For example, certain detected markings may cause the system to send predetermined notifications and/or to send notifications to a predetermined device based at least in part on the detected markings.

Additionally, in examples, when a notification is to be output on the second device(s), the command generator may generate a command to configure the second device(s) for output of the notification. For example, the command may cause a volume level associated with the second device(s) to increase, a lighting element to emit light, images being displayed to cease, an application to initiate that interrupts display of other information being viewed and/or that interrupts output of audio being currently output. Additional configurations may include causing one or more accessory devices, such as "smart home" devices to operate. An example of such operation would include causing smart light bulbs and/or plugs to turn lights on and off. Additionally, and particularly in circumstances where emergency services are called, the remote system may send a command that may cause one or more locks to unlock to allow emergency personnel to enter the environment, and/or a command that may cause smart lights or similar accessory devices to illuminate a path from an entryway to the area where the event occurred.

In the examples described herein where the additional occupant is associated with a "helper" type, the system may determine that one or more confirmatory operations are to be performed. For example, the event data may be associated with a confidence value indicating a confidence at which the predefined event was determined to have occurred. In examples where the confidence value satisfies a threshold confidence that the predefined event occurred, the remote system may determine that the confirmatory operations are to be performed. The confirmatory operations may include, in examples, sending commands for the first device to perform one or more operations. Those operations may include, in examples, causing a microphone of the selected device to capture audio from the environment and acoustic-event detection (AED) analysis may be performed by the selected device in addition to and/or instead of by a remote system. An AED component of the selected device and/or the remote system may utilize the audio data generated by the microphone of the selected device to determine if an audio fingerprint of the audio data, or portion thereof, corresponds to a reference audio fingerprint associated with the predefined event. For example, the one or more predefined events may be associated with one or more reference audio fingerprints characteristic of sound made when the event occurs. For example, the sound of a human body hitting a floor in the event of a fall may have a given audio fingerprint, a person expressing pain and/or disorientation may have another audio fingerprint, glass breaking may have yet another audio fingerprint, cessation of breathing, etc. The AED component may receive an indication of the type of predefined event that has been detected and may utilize reference audio fingerprints associated with that event type for analysis in association with the audio fingerprint in question. The AED component may determine that the audio fingerprint corresponds to at least one of the reference audio fingerprints, such as to a given confidence level, and may generate confirmatory data indicating that the audio fingerprint corresponds to the at least one reference audio fingerprint. While a person falling is utilized as an example of a detected event, it should be understood that additional events may be detected. For example, an event may be the delivery of a package, detection of motion at a given area such as a front door, one or more medical conditions such as elevated blood pressure, low heart rate, etc.

It should be understood that the activation of microphones and/or the generation of information from microphones is performed only in instances where the user has provided consent for such actions to be performed.

Additionally, or alternatively, the remote system may perform event-confirmation operations associated with natural language understanding (NLU) techniques. For example, based at least in part on determining that the additional occupant has entered the area associated with the event, the remote system may generate audio data representing a request for audible confirmation that the predefined event has occurred. For example, the request may be "A fall has been detected. Is everything okay?" A text-to-speech component of the remote system may be utilized to generate the audio data, in examples. The audio data may be sent from the remote system to the selected device, which may cause the selected device to output audio representing the request via a speaker of the selected device. The user and/or another user in the environment may provide an audible response to the request. The response may confirm or refute that the predefined event occurred. For example, when the request includes "Is everything okay?" a response of "no" may indicate that the predefined event occurred while a response of "yes" may indicate that the predefined event did not occur. The microphone of the selected device may receive audio representing the response and may generate corresponding audio data. The audio data may be sent to the remote system for speech processing, which may include generating, utilizing automatic speech recognition techniques, text data corresponding to the audio data and then utilizing the text data to determine, utilizing NLU techniques, intent data representing the response.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations. In examples, the information utilized herein may be encrypted if and when it is transferred between devices and systems. Also, the operations described herein and information identified, determined, and/or generated will be utilized only in a manner that is designed to comply with applicable local rules and regulations.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for contextual response to motion-based events. The system 100 may include, for example, first electronic devices 102, which may include communal devices, personal devices, and/or devices configured with sensors to detect environmental changes. In certain examples, at least some of the first devices 102 may be voice-enabled devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The first devices 102 may also include sensing devices configured to receive electromagnetic waves from an environment in which a given sensing device is situated and to determine when one or more predefined events occur within the environment. The electronic devices 102 may also include personal devices, such as a mobile phone, tablet, laptop, wearable device, and/or other computing device. Additionally, the system 100 may include second electronic devices 104. The second electronic devices 104 may be the same as or similar to the first devices 102, except that the second devices 104 may be located in a different area than the first devices 102. The first devices 102 and the second devices 104 may be configured to send data to and/or receive data from a remote system 106, such as via a network 108. Additionally, it should be understood that a given space and/or environment may include numerous first devices 102 and/or second devices 104. It should also be understood that when a "space" or "environment" is used herein, those terms mean an area and not necessarily a given room, building, or other structure, unless otherwise specifically described as such.

The first devices 102 and the second devices 104 may include, in examples, one or more components, such as, for example, one or more processors 110, one or more network interfaces 112, memory 114, one or more microphones 116, one or more speakers 118, one or more displays 122, and/or one or more sensors 124. The microphones 116 may be configured to capture audio, such as user utterances, and generate corresponding audio data. The speakers 118 may be configured to output audio, such as audio corresponding to audio data received from another device and/or the system 106. It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. The memory 114 may include one or more components such as, for example, an acoustic-event detection (AED) component, which will be described in more detail below. It should be understood that when voice-enabled devices are described herein, those voice-enabled devices may include phones, computers, and/or other computing devices. The cameras 120 may be configured to receive images from the environment and generate corresponding image data, which may be sent to the remote system 106. It should be understood that the cameras 120 may be in a default "off" mode unless specifically requested to be turned on by the user and/or when the user has provided permission to turn the cameras 120 on when a predefined event has been detected. The displays 122 may be configured to receive image data and display corresponding images.

The sensors 124 of the devices 102, 104 may include radar sensors, microphones, motion sensors, cameras, temperature sensors, an accelerometer, a gyroscope, a heartbeat sensor, a liquid, such as perspiration, sensor, a global positioning system (GPS) sensor, and/or other sensors configured to detect an environmental change. The sensors 124 may also include sensors utilized in computer vision, blood pressure monitors, heart rate monitors, and/or sensors in wearable devices such as EKG sensors, etc. With respect to radar sensors, antennas of the devices 102, 104 may be configured to send and receive electromagnetic waves in radio and/or microwave domains. At least one of the antennas may be configured to send and receive electromagnetic waves having a bandwidth in the ultra-wide band range, such as a bandwidth at or around 6 GHz. At least one other of the antennas may be configured to send and receive electromagnetic waves having a bandwidth in the millimeter wave range, such as a bandwidth at or around 60 GHz. It should be understood that while the examples used herein describe one antenna associated with the ultra-wide band range and one antenna associated with the millimeter band range, each or either of these antennas may include multiple antennas and/or antenna arrays. Additionally, while specific bands are described herein, they are provided by way of example. The bandwidth may be, for example, about 4 GHz to about 10 GHz, and/or from about 40 GHz to about 80 GHz. The antennas may transmit the electromagnetic waves into the environment in which the device 102, 104 is located and may receive the electromagnetic waves back at the devices 102, 104. The distortion and/or change in the electromagnetic waves as received by the device 102, 104 may indicate motion and/or a change in position of one or more subjects within the environment. The changes in motion that may be detected may include, for example, entry and/or exit of a user from the environment, location of the user relative to the devices 102, 104, number of users in the environment, an angle at which a user is positioned relative to the devices 102, 104, a posture of a user, movement of a user within the environment, a direction of travel of a user, a size of a user, etc.

The electromagnetic waves may be received by the antennas, which may generate corresponding sensor data. The sensor data may be sent to additional components of the devices 102, 104 and/or to an event-detection component 130 of the remote system 106, which may determine whether one or more predefined events has occurred based at least in part on the sensor data. For example, one or more models may be configured to receive the sensor data as input and determine if one or more characteristics associated with the sensor data correspond to reference sensor data associated with the predefined event(s). By way of example, in the case of a user fall, the sensor data may indicate that the position of the user has changed quickly from a standing to a prone or otherwise horizontal position and/or to a kneeling position. By way of additional example, the sensor data may indicate a slouching motion of a user. Other examples may include pet detection and/or other subject detection. In these example, zones may be utilized to determine if an event has occurred. For example, a zone may be set to a certain portion of the environment, such as a countertop for detecting the presence of a pet that is positioned on the countertop. The zones may be set by a user and/or determined from an analysis of the environment at issue. In these examples, the event-detection component 130 may analyze the sensor data with respect to reference data indicated to correspond to these and/or other events. When the event-detection component determines that the sensor data corresponds to the reference sensor data, such as above a threshold confidence, the event-detection component may generate event data indicating that the predefined event has occurred. The event data may be sent from the devices 102, 104 to the remote system 106 for processing.

In examples, the devices 102, 104 may be activated and/or the radar functionality may be activated upon the detection of a given event and/or occurrence. For example, the device 102, 104 and/or one or more other devices within the environment may include one or more infrared sensors and may detect the presence of a person. Enabling the radar functionality may be based at least in part on detecting the presence of the person. In other examples, a microphone situated in the environment may detect sound being made from the environment, such as footsteps of someone entering the environment, for example, and enabling the radar functionality may be based at least in part on detecting such sound.

The remote system 106 may include components such as, for example, a speech-processing system 126, a user registry 128, an event-detection component 130, a subject classifier 132, a command generator 134, a location component 136, a notification component 138, and/or a communications system 140. It should be understood that while the speech-processing system 126 and the other components are depicted as separate from each other in FIG. 1, some or all of the components may be a part of the same system. The speech-processing system 126 may include an automatic speech recognition component (ASR) 142, a natural language understanding component (NLU) 144, and/or a text-to-speech component (TTS) 146. Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills. "Skills," as described herein may be applications and/or may be a subset of an application. For example, a skill may receive data representing an intent. For example, an intent may be determined by the NLU component 144 and/or as determined from user input via a computing device. Skills may be configured to utilize the intent to output data for input to the TTS component 146, a link or other resource locator for audio data, and/or a command to a device, such as the device 102.

In instances where a voice-enabled device is utilized, skills may extend the functionality of devices, the devices 102, 104, that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device, and send data and/or instructions associated with the input to one or more other devices.

The components of the remote system 106 are described in detail below. In examples, some or each of the components of the remote system 106 may include their own processor(s), network interface(s), and/or memory. As such, by way of example, the speech-processing system 126 may include and/or be associated with processor(s), network interface(s), and/or memory. The event-detection component 130 and/or the communications system 140 may include and/or be associated with different processor(s), network interface(s), and/or memory, or one or more of these components may utilize some or all of the same processor(s), network interface(s), and/or memory utilized by the speech-processing system 126. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 128 may be configured to determine and/or generate associations between users, user accounts, and/or devices. For example, one or more associations between user accounts may be identified, determined, and/or generated by the user registry 128. The user registry 128 may additionally store information indicating one or more applications and/or resources accessible to and/or enabled for a given user account. Additionally, the user registry 128 may include information indicating device identifiers, such as naming identifiers, associated with a given user account, as well as device types associated with the device identifiers. The user registry 128 may also include information indicating user account identifiers, naming indicators of devices associated with user accounts, and/or associations between devices, such as the devices 102, 104. The user registry 128 may also include information associated with usage of the devices 102, 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 126 may be configured to receive audio data from the devices 102, 104 and/or other devices and perform speech-processing operations. For example, the ASR component 142 may be configured to generate text data corresponding to the audio data, and the NLU component 144 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "Yes, I've fallen, call Rob," the NLU component 144 may identify a "call" intent and the payload may be "Rob." In this example where the intent data indicates an intent to establish a communication channel with a device associated with "Rob," the speech-processing system 126 may call one or more speechlets to effectuate the intent. Speechlets, as described herein may otherwise be described as applications and may include functionality for utilizing intent data to generate directives and/or instructions. For example, a communications speechlet may be called when the intent indicates that an action is to be performed associated with establishing a communication channel with another device. The speechlet may be designated as being configured to handle the intent of establishing a communication channel, for example. The speechlet may receive the intent data and/or other data associated with the user utterance from the NLU component 144, such as by an orchestrator of the remote system 106, and may perform operations to instruct the device 102, 104 to perform an operation. For example, the communications speechlet may retrieve a device identifier of a device with which to establish a communication channel and may cause the communication channel to be established utilizing the remote system 106. The remote system 106 may generate audio data confirming that a communication channel has been established, such as by the TTS component 146. The audio data may be sent from the remote system 106 to the device 102, 104 for output of corresponding audio by the speakers 118 of the device 102, 104. When a natural language generator is described herein, the natural language generator may be a component of a speechlet and may be configured to generator audio data representing, for example, a notification to a user. Natural language processing is described in more detail with respect to FIG. 8, below.

The event-detection component 130 may be configured to receive sensor data, such as from the devices 102, 104, and determine whether a predefined event has occurred. For example, the sensor data generated by the devices 102, 104 may be sent from the devices 102, 104 to the remote system 106. The event-detection component 130 may utilize one or more models that are configured to receive the sensor data as input and determine if one or more characteristics associated with the sensor data correspond to reference sensor data associated with the predefined event(s). In examples, the sensor data may include audio data corresponding to audio received by antennas of the device 102, 104. By way of example, in the case of a user fall, the audio data may indicate that the position of the user has changed quickly from a standing to a prone or otherwise horizontal position and/or to a kneeling position. By way of additional example, the audio data may indicate a slouching motion of a user. In these examples, the event-detection component 130 may analyze the audio data with respect to reference data indicated to correspond to these and/or other events. When the event-detection component 130 determines that the audio data corresponds to the reference audio data, such as above a threshold confidence, the event-detection component 130 may identify, determine, and/or generate event data indicating that the predefined event has occurred. In other examples, as described above, the event data may be generated by event-detection component of the device 102, 104. In this way, detection of an event may include detection of a motion-based event utilizing one or more of the processes and/or sensors described herein.

In examples, contextual information associated with the subject associated with the event as well as contextual information associated with other subjects in the environment may be determined. The subject classifier 132 may be configured to determine a type of the subject associated with the event. The subject classifier 132 may utilize information provided by the device 102 from which the sensor data was received, such as information indicating the size, shape, and/or identity of the subject to classify the subject into one or more predefined subject types. For example, one subject type may correspond to people that are less likely to be able to help themselves and may represent subjects with a size and/or shape that is likely to correspond to such a person. In certain examples, the information about the subject may be utilized to identify a user profile associated with the subject and that user profile may be utilized to classify the subject. In still other examples, additional information such as beacon data from a personal device associated with the subject may be utilized. For example, if the event is associated with a subject such as a person and that person has his/her personal device, the personal device may send data indicating that the personal device is present, such as by beaconing and/or short-range wireless connection, such as Bluetooth connection. The subject classifier 132 may utilize some or all of this information to classify the subject associated with the event. If the subject is associated with a particular subject type, such as "non-helpers," the system 100 may determine that instead of or in addition to attempting to interact with the person, such as by asking if the person needs help or to confirm that the event occurred, the system 100 may determine that an additional occupant should be identified and notified of the event so that the additional occupant can lend aid.

It should be understood that while the predefined type described herein corresponds to "non-helper," other predefined classes may be utilized. For example, during a setup process, the system 100 and/or one or more users may define various subject types, associate user profiles and/or information about users and/or subjects with those subject types, associate notification types and/or modes with the types and/or event types, and/or associate actions for the system 100 to take based on the types of the subject associated with the event and/or the types of additional occupants that are detected. The setup process may also include receiving user input indicating one or more devices 102, 104 and/or user profiles that may not be associated with users in the environment that may be utilized when an event is detected. For example, a user may indicate that a device associated with a neighbor should be notified of the event, such as in given circumstances where, for example, no "helper" subject is detected in the environment. Additional examples include establishing a communication channel with emergency personnel, with a device associated with a user profile of a "helper," etc. Configuration of notifications and actions taken when an event occurs may be performed utilizing user input and/or may be performed by the system, such as utilizing information about the devices and user profiles associated with given account data.

When an event is detected as described herein, the second devices 104 associated with the environment may be enabled and/or may be instructed to send sensor data and/or to determine whether another occupant is present. For example, the event-detection component 130 may generate and send an event indicator to the command generator 134. The event indicator may cause the command generator 134 to generate a command to be sent to the second devices 104. For example, the first device 102 that sent the sensor data indicating the event occurred may be associated with account data. The account data may also indicate the second devices 104 associated with the account data. The command generator 134 may utilize the account data to identify the second devices 104 and may send an instance of the command to enable sensors and/or to send sensor data and/or to detect presence to some or each of the second devices 104.

The second device(s) 104 may receive the command from the command generator 134 and may initiate a process of detecting the presence of the other occupant. For example, the second device(s) 104 may have already had sensors 124 enabled and may have been actively generating sensor data. In these examples, receipt of the command may cause the sensor data to be sent to the remote system 106 and/or may cause the second device(s) 104 to determine whether the sensor data indicates that presence is detected. In other examples, the second device(s) 104 may have already determined that presence was detected and may send an indication that presence was detected to the remote system 106. In still other examples, the sensors 124 of the second device(s) 104 may not have been enabled and the command may cause the sensors 124 to enable and to start generating sensor data. In addition to sending an indication that presence of an occupant has been sensed, the second device(s) 104 may send additional data associated with the detected presence. For example, the additional data may include an indication of the size, shape, type, and/or identification of the occupant. It should be understood that while examples used herein illustrate the detection of a single additional occupant, this disclosure includes the detection of multiple additional occupants and/or subjects associated with a given environment. It should also be understood that while "occupant" is used to infer that the other subject is alive, this disclosure also includes the identification of subjects that are not alive.

The subject classifier 132 may classify the additional occupant, such as by utilizing data sent from the second device(s) 104. The data may include, for example, sensor data indicating a size, shape, and/or identity of the additional occupant and/or one or more devices 104 associated with the additional occupant, such as a personal phone, watch, or other wearable device. In examples, the additional occupant may be associated with a "helper" subject type. In other examples, the additional occupant may be associated with a "non-helper" subject type, or other type such as "pet." The subject classifier 132 may generate data indicating the determined subject type and/or identifier of the additional occupant and may provide that data to the command generator 134.

The command generator 134 may then determine one or more commands to generate that, when executed, cause one or more devices 102, 104 associated with the environment to perform an action. For example, depending on the subject type of the additional occupant and/or the event type at issue, the command generator 134 may generate a command to establish a communication channel between various devices, to send a notification to one or more devices, to cause one or more devices to change a configuration, to cause one or more lighting elements to emit light, etc. In examples where the additional occupant is associated with the "helper" type, the command generator 134 may send an event indicator and/or the subject identifier and/or type data to the notification component 138. The notification component 138 may generate a notification, which may be selected from multiple potential notifications based at least in part on the event type and/or the subject identifier and/or type. For example, the notification may indicate that the event has occurred, a location associated with the event, an identity of the subject involved in the event, etc. In certain examples, such as when the first device 102 or another device in the area where the event occurred includes a camera 120, the notification may allow for a live or near-live video feed of the field of view of the camera 120 to be transmitted to the second device(s) 104. This may allow the additional occupant to see the area and determine if help is needed and/or what help may be needed. The notification may additionally, or alternatively, allow the user to establish a communication channel with the first device 102 so that the additional occupant may speak with the individual involved in the incident. The notification may additionally, or alternatively, allow the user to establish a communication channel with one or more other devices, such as devices associated with emergency services. In other examples where the additional occupant is associated with a "non-helper" type, the notification may differ from the notification sent when the additional occupant is associated with the "helper" type. For example, instead of informing the additional occupant of a location of the event and prompting the additional occupant to lend assistance, the notification may tell the additional occupant to find a helper, call a helper, etc. Additionally, when no additional occupant is present and/or when the additional occupant is of a type predesignated as not capable or less capable of providing aid, the command generator 134 may send a notification to a predefined device, such as a device associated with a neighbor user profile, a parent user profile, or other predesignated user profile.

In examples where a notification is to be sent to a device 104 associated with the additional occupant, the notification may be sent to the command generator 134, which may send data representing the notification and a command to output the notification to the second device(s) 104. The second device(s) 104 that receive the data representing the notification may be selected based at least in part on which device sensed the presence of the additional occupant, which device is designated as a personal device associated with the additional occupant, and/or hardware configurations of the devices. For example, if the notification includes audio data, the selected second device(s) 104 may be devices that include a speaker 118.

Thereafter, the additional occupant may move from his/her present location toward the area where the event occurred. The first device 102 may detect, utilizing the one or more sensors 124 described herein, the location of the additional occupant and may send corresponding sensor data to a location component 136 of the remote system 106. The location component 136 may determine when a location of the additional occupant satisfies a threshold distance from a location of the event and may send an indication that the additional occupant is near the event to the command generator 134. Alternatively, the first device 102 may detect the presence of the additional occupant and may perform the location-related operations described above.

The command generator 134 may then determine one or more actions to be taken based at least in part on the additional occupant having moved to the area where the event occurred. The actions may include causing the first device 102 or another device to output audio and/or display images requesting confirmation that the event occurred, asking if help is needed, etc. Additional actions may include establishing a communication channel with another device, such as a device associated with emergency services. The command generator 134 may generate and send a command to perform the action to the first device 102 or another device. In examples where the action includes establishing a communication channel, the command generator 134 may send a request to establish a communication channel to a communications system 140. The communications system 140 may determine the device identifier of the first device 102 as well as the device identifier of the device to which the communication channel is to be established and may utilize these device identifiers to establish the communication channel.

Additionally, in examples, when a notification is to be output on the second device(s) 104, the command generator 134 may generate a command to configure the second device(s) 104 for output of the notification. For example, the command may cause a volume level associated with the second device(s) 104 to increase, a lighting element to emit light, images being displayed to cease, an application to initiate that interrupts display of other information being viewed and/or that interrupts output of audio being currently output. Additional configurations may include causing one or more accessory devices, such as "smart home" devices to operate. An example of such operation would include causing smart light bulbs and/or plugs to turn lights on and off. Additionally, and particularly in circumstances where emergency services are called, the remote system may send a command that may cause one or more locks to unlock to allow emergency personnel to enter the environment, and/or a command that may cause smart lights or similar accessory devices to illuminate a path from an entryway to the area where the event occurred.

In the examples described herein where the additional occupant is associated with a "helper" type, the system 100 may determine that one or more confirmatory operations are to be performed. For example, the event data may be associated with a confidence value indicating a confidence at which the predefined event was determined to have occurred. In examples where the confidence value satisfies a threshold confidence that the predefined event occurred, the remote system 106 may determine that the confirmatory operations are to be performed. The confirmatory operations may include, in examples, sending commands for the first device 102 to perform one or more operations. Those operations may include, in examples, causing a microphone 116 of the selected device to capture audio from the environment and acoustic-event detection (AED) analysis may be performed by the selected device in addition to and/or instead of by a remote system 106. An AED component of the selected device 102 and/or the remote system 106 may utilize the audio data generated by the microphone 116 of the selected device 102 to determine if an audio fingerprint of the audio data, or portion thereof, corresponds to a reference audio fingerprint associated with the predefined event. For example, the one or more predefined events may be associated with one or more reference audio fingerprints characteristic of sound made when the event occurs. For example, the sound of a human body hitting a floor in the event of a fall may have a given audio fingerprint, a person expressing pain and/or disorientation may have another audio fingerprint, glass breaking may have yet another audio fingerprint, cessation of breathing, etc. The AED component may receive an indication of the type of predefined event that has been detected and may utilize reference audio fingerprints associated with that event type for analysis in association with the audio fingerprint in question. The AED component may determine that the audio fingerprint corresponds to at least one of the reference audio fingerprints, such as to a given confidence level, and may generate confirmatory data indicating that the audio fingerprint corresponds to the at least one reference audio fingerprint.

It should be understood that the activation of microphones 116 and/or the generation of information from microphones 116 is performed only in instances where the user has provided consent for such actions to be performed.

Additionally, or alternatively, the remote system 106 may perform event-confirmation operations associated with natural language understanding (NLU) techniques. For example, based at least in part on determining that the additional occupant has entered the area associated with the event, the remote system 106 may generate audio data representing a request for audible confirmation that the predefined event has occurred. For example, the request may be "A fall has been detected. Is everything okay?" The TTS component 146 may be utilized to generate the audio data, in examples. The audio data may be sent from the remote system 106 to the selected device 102, which may cause the selected device 102 to output audio representing the request via a speaker 118 of the selected device 102. The user and/or another user in the environment may provide an audible response to the request. The response may confirm or refute that the predefined event occurred. For example, when the request includes "Is everything okay?" a response of "no" may indicate that the predefined event occurred while a response of "yes" may indicate that the predefined event did not occur. The microphone 116 of the selected device 102 may receive audio representing the response and may generate corresponding audio data. The audio data may be sent to the remote system 106 for speech processing, which may include generating, utilizing automatic speech recognition techniques, text data corresponding to the audio data and then utilizing the text data to determine, utilizing NLU techniques, intent data representing the response.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104.

As shown in FIG. 1, several of the components of the remote system 106 and the associated functionality of those components as described herein may be performed by one or more of the devices 102, 104. Additionally, or alternatively, some or all of the components and/or functionalities associated with the devices 102, 104 may be performed by the remote system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110 and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the remote system 106 may possess its own local memory, which also may store program components, program data, and/or one or more operating systems.

The memory 114 and/or the memory described with respect to the components of the remote system 106 may include volatile and nonvolatile memory, removable and non-removable media implemented in any method or technology for storage of information, such as computer-readable instructions, data structures, program component, or other data. Such memory 114 and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the remote system 106 may be implemented as computer-readable storage media ("CRSM"), which may be any available physical media accessible by the processor(s) 110 and/or the processor(s) described with respect to the remote system 106 to execute instructions stored on the memory 114 and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112 and/or the network interface(s) described with respect to the components of the remote system 106 may enable messages between the components and/or devices shown in system 100 and/or with one or more other polling systems, as well as other networked devices. Such network interface(s) 112 and/or the network interface(s) described with respect to the components of the remote system 106 may include one or more network interface controllers (NICs) or other types of transceiver devices to send and receive messages over the network 108.

For instance, each of the network interface(s) 112 and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or the network interface(s) described with respect to the components of the remote system 106 may include a wide area network (WAN) component to enable message over a wide area network.

In some instances, the remote system 106 may be local to an environment associated the devices 102, 104. For instance, the remote system 106 may be located within one or more of the devices 102, 104. In some instances, some or all of the functionality of the remote system 106 may be performed by one or more of the devices 102, 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2:
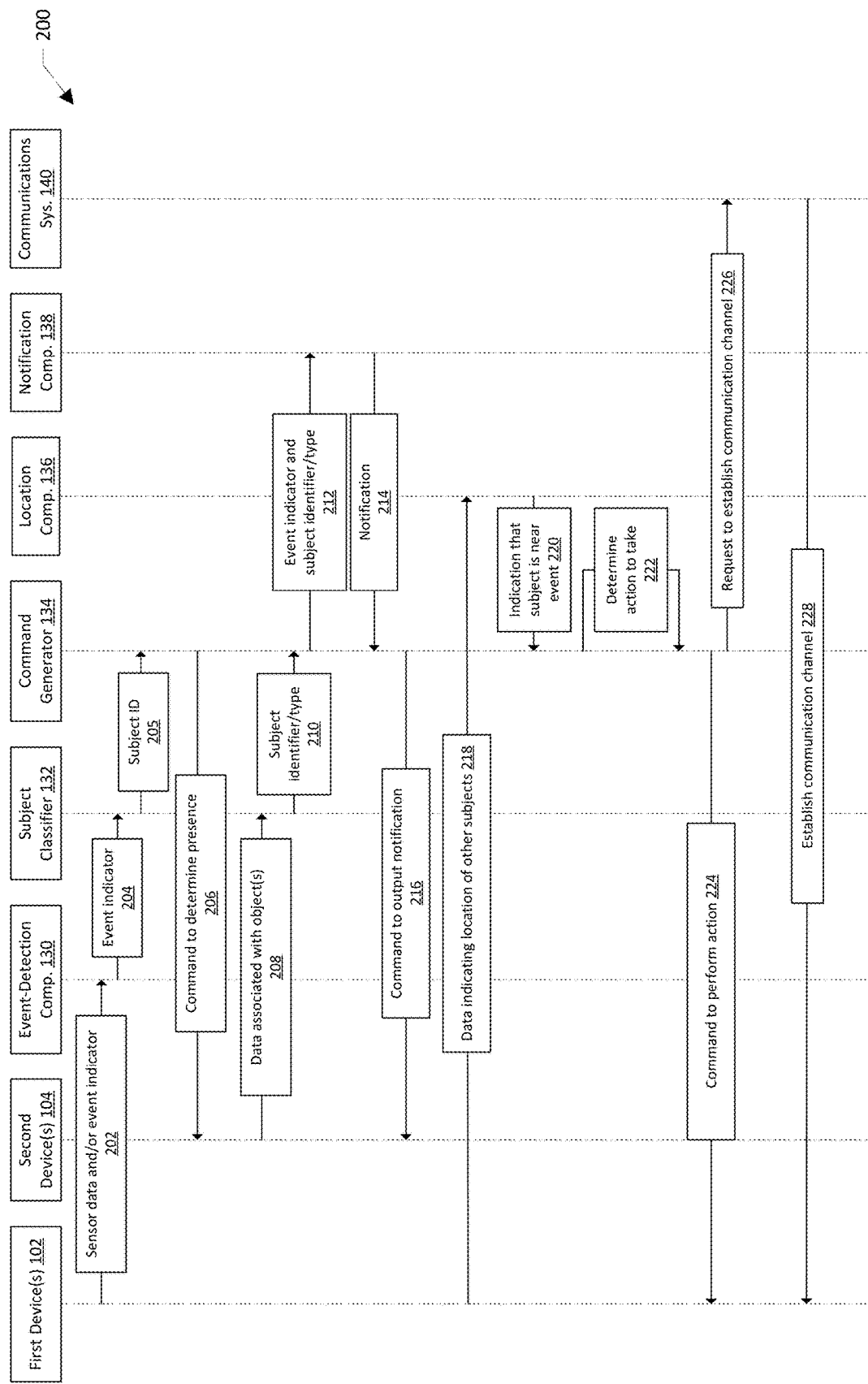
FIG. 2 illustrates a sequence diagram of an example sequence of operations for contextual response to motion-based events.

FIG. 2 illustrates a sequence diagram of an example sequence 200 of operations for contextual response to motion-based events. It should be understood that while the sequence diagram 200 is described in a stepwise manner, some or all of the operations described with respect to FIG. 2 may be performed in a different order and/or in parallel.

At block 202, a first device 102 may send sensor data and/or an event indicator to an event-detection component 130. For example, sensors of the first device 102 may include radar sensors, microphones, motion sensors, cameras, temperature sensors, an accelerometer, a gyroscope, a heartbeat sensor, a liquid, such as perspiration, sensor, a global positioning system (GPS) sensor, and/or other sensors configured to detect an environmental change. With respect to radar sensors, antennas of the device 102 may be configured to send and receive electromagnetic waves in radio and/or microwave domains. At least one of the antennas may be configured to send and receive electromagnetic waves having a bandwidth in the ultra-wide band range, such as a bandwidth at or around 6 GHz. At least one other of the antennas may be configured to send and receive electromagnetic waves having a bandwidth in the millimeter wave range, such as a bandwidth at or around 60 GHz. It should be understood that while the examples used herein describe one antenna associated with the ultra-wide band range and one antenna associated with the millimeter band range, each or either of these antennas may include multiple antennas and/or antenna arrays. Additionally, while specific bands are described herein, they are provided by way of example. The bandwidth may be, for example, about 4 GHz to about 10 GHz, and/or from about 40 GHz to about 80 GHz. The antennas may transmit the electromagnetic waves into the environment in which the device 102 is located and may receive the electromagnetic waves back at the device 102. The distortion and/or change in the electromagnetic waves as received by the device 102 may indicate motion and/or a change in position of one or more subjects within the environment. The changes in motion that may be detected may include, for example, entry and/or exit of a user from the environment, location of the user relative to the device 102, number of users in the environment, an angle at which a user is positioned relative to the device 102, a posture of a user, movement of a user within the environment, a direction of travel of a user, a size of a user, etc.

At block 204, the event-detection component 130 may send an event indicator to a subject classifier 132. For example, the electromagnetic waves may be received by the antennas, which may generate corresponding sensor data. The sensor data may be sent to additional components of the device 102 and/or to the event-detection component 130, which may determine whether one or more predefined events has occurred based at least in part on the sensor data. For example, one or more models may be configured to receive the sensor data as input and determine if one or more characteristics associated with the sensor data correspond to reference sensor data associated with the predefined event(s). By way of example, in the case of a user fall, the sensor data may indicate that the position of the user has changed quickly from a standing to a prone or otherwise horizontal position and/or to a kneeling position. By way of additional example, the sensor data may indicate a slouching motion of a user. Other examples may include pet detection and/or other subject detection. In these example, zones may be utilized to determine if an event has occurred. For example, a zone may be set to a certain portion of the environment, such as a countertop for detecting the presence of a pet that is positioned on the countertop. The zones may be set by a user and/or determined from an analysis of the environment at issue. In these examples, the event-detection component 130 may analyze the sensor data with respect to reference data indicated to correspond to these and/or other events. When the event-detection component determines that the sensor data corresponds to the reference sensor data, such as above a threshold confidence, the event-detection component may generate event data indicating that the predefined event has occurred. The event data may be sent from the device(s) 102 to the remote system for processing.

At block 205, the subject classifier 132 may determine a subject type associated with the subject involved in the event. For example, contextual information associated with the subject associated with the event as well as contextual information associated with other subjects in the environment may be determined. For example, a subject classifier may be configured to determine a type of the subject associated with the event. The subject classifier may utilize information provided by the device from which the sensor data was received, such as information indicating the size, shape, and/or identity of the subject to classify the subject into one or more predefined subject types. For example, one subject type may correspond to people that are less likely to be able to help themselves and may represent subjects with a size and/or shape that is likely to correspond to such a person. In certain examples, the information about the subject may be utilized to identify a user profile associated with the subject and that user profile may be utilized to classify the subject. In still other examples, additional information such as beacon data from a personal device associated with the subject may be utilized. For example, if the event is associated with a subject such as a person and that person has his/her personal device, the personal device may send data indicating that the personal device is present, such as by beaconing and/or short-range wireless connection, such as Bluetooth connection. The subject classifier may utilize some or all of this information to classify the subject associated with the event. If the subject is associated with a particular subject type, such as "non-helpers," the system may determine that instead of or in addition to attempting to interact with the person, such as by asking if the person needs help or to confirm that the event occurred, the system may determine that an additional occupant should be identified and notified of the event so that the additional occupant can lend aid. An indication of the event and/or the subject identifier may be sent to the command generator 134.

At block 206, the command generator 134 may send a command to determine presence of additional subjects to one or more second devices 104. For example, contextual information associated with the subject associated with the event as well as contextual information associated with other subjects in the environment may be utilized to perform the additional operations described herein. For example, the subject classifier 132 may be configured to determine a type of the subject associated with the event. The subject classifier 132 may utilize information provided by the device(s) 102 from which the sensor data was received, such as information indicating the size, shape, and/or identity of the subject to classify the subject into one or more predefined subject types. For example, one subject type may correspond to people that are less likely to be able to help themselves and may represent subjects with a size and/or shape that is likely to correspond to such a person. In certain examples, the information about the subject may be utilized to identify a user profile associated with the subject and that user profile may be utilized to classify the subject. In still other examples, additional information such as beacon data from a personal device associated with the subject may be utilized. For example, if the event is associated with a subject such as a person and that person has his/her personal device, the personal device may send data indicating that the personal device is present, such as by beaconing and/or short-range wireless connection, such as Bluetooth connection. The subject classifier 132 may utilize some or all of this information to classify the subject associated with the event. If the subject is associated with a particular subject type, such as "non-helpers," the system may determine that instead of or in addition to attempting to interact with the person, such as by asking if the person needs help or to confirm that the event occurred, the system may determine that an additional occupant should be identified and notified of the event so that the additional occupant can lend aid.

It should be understood that while the predefined type described herein corresponds to "non-helpers," other predefined classes may be utilized. For example, during a setup process, the system and/or one or more users may define various subject types, associate user profiles and/or information about users and/or subjects with those subject types, associate notification types and/or modes with the types and/or event types, and/or associate actions for the system to take based on the types of the subject associated with the event and/or the types of additional occupants that are detected. The setup process may also include receiving user input indicating one or more devices 102, 104 and/or user profiles that may not be associated with users in the environment that may be utilized when an event is detected. For example, a user may indicate that a device associated with a neighbor should be notified of the event, such as in given circumstances where, for example, no "helper" subject is detected in the environment. Additional examples include establishing a communication channel with emergency personnel, with a device associated with a user profile of a "helper," etc. Configuration of notifications and actions taken when an event occurs may be performed utilizing user input and/or may be performed by the system, such as utilizing information about the devices and user profiles associated with given account data.

When an event is detected as described herein, the second devices 104 associated with the environment may be enabled and/or may be instructed to send sensor data and/or to determine whether another occupant is present. For example, the command generator 134 may generate a command to be sent to the second devices 104. For example, the first device(s) 102 that sent the sensor data indicating the event occurred may be associated with account data. The account data may also indicate the second devices 104 associated with the account data. The command generator 134 may utilize the account data to identify the second devices 104 and may send an instance of the command to enable sensors and/or to send sensor data and/or to detect presence to some or each of the second devices 104.

At block 208, the second device(s) 104 may send data associated with detected subject(s). The second device(s) 104 may receive the command from the command generator 134 and may initiate a process of detecting the presence of the other occupant. For example, the second device(s) 104 may have already had sensors enabled and may have been actively generating sensor data. In these examples, receipt of the command may cause the sensor data to be sent to the remote system and/or may cause the second device(s) 104 to determine whether the sensor data indicates that presence is detected. In other examples, the second device(s) 104 may have already determined that presence was detected and may send an indication that presence was detected to the remote system. In still other examples, the sensors of the second device(s) 104 may not have been enabled and the command may cause the sensors to enable and to start generating sensor data. In addition to sending an indication that presence of an occupant has been sensed, the second device(s) 104 may send additional data associated with the detected presence. For example, the additional data may include an indication of the size, shape, type, and/or identification of the occupant. It should be understood that while examples used herein illustrate the detection of a single additional occupant, this disclosure includes the detection of multiple additional occupants and/or subjects associated with a given environment. It should also be understood that while "occupant" is used to infer that the other subject is alive, this disclosure also includes the identification of subjects that are not alive.

At block 210, a subject classifier 132 may classify and/or identify the subject(s) and may send an indication of the type and/or identification to the command generator 134. For example, the subject classifier 132 may classify the additional occupant, such as by utilizing data sent from the second device(s) 104. The data may include, for example, sensor data indicating a size, shape, and/or identity of the additional occupant and/or one or more devices 104 associated with the additional occupant, such as a personal phone, watch, or other wearable device. In examples, the additional occupant may be associated with a "helper" subject type. In other examples, the additional occupant may be associated with a "non-helper" subject type, or other type such as "pet." The subject classifier 132 may generate data indicating the determined subject type and/or identifier of the additional occupant and may provide that data to the command generator 134.

At block 212, the command generator 134 may send an event indicator and the subject identifier and/or type to a notification component 138. For example, the command generator 134 may determine one or more commands to generate that, when executed, cause one or more devices 102, 104 associated with the environment to perform an action. For example, depending on the subject type of the additional occupant and/or the event type at issue, the command generator 134 may generate a command to establish a communication channel between various devices, to send a notification to one or more devices, to cause one or more devices to change a configuration, to cause one or more lighting elements to emit light, etc. In examples where the additional occupant is associated with the "helper" type, the command generator 134 may send an event indicator and/or the subject identifier and/or type data to the notification component 138.

At block 214, the notification component 138 may generate a notification based at least in part on the event indicator and/or the subject identifier and/or type and may send the notification to the command generator 134. For example, the notification component 138 may generate a notification, which may be selected from multiple potential notifications based at least in part on the event type and/or the subject identifier and/or type. For example, the notification may indicate that the event has occurred, a location associated with the event, an identity of the subject involved in the event, etc. In certain examples, such as when the first device 102 or another device in the area where the event occurred includes a camera 120, the notification may allow for a live or near-live video feed of the field of view of the camera 120 to be transmitted to the second device(s) 104. This may allow the additional occupant to see the area and determine if help is needed and/or what help may be needed. The notification may additionally, or alternatively, allow the user to establish a communication channel with the first device 102 so that the additional occupant may speak with the individual involved in the incident. The notification may additionally, or alternatively, allow the user to establish a communication channel with one or more other devices, such as devices associated with emergency services. In other examples where the additional occupant is associated with a "non-helper" type, the notification may differ from the notification sent when the additional occupant is associated with the "helper" type. For example, instead of informing the additional occupant of a location of the event and prompting the additional occupant to lend assistance, the notification may tell the additional occupant to find a helper, call a helper, etc. Additionally, when no additional occupant is present and/or when the additional occupant is of a type predesignated as not capable or less capable of providing aid, the command generator 134 may send a notification to a predefined device, such as a device associated with a neighbor user profile, a parent user profile, or other predesignated user profile. In examples where a notification is to be sent to the second device 104 associated with the additional occupant, the notification may be sent to the command generator 134

At block 216, the command generator 134 may send data representing the notification and a command to output the notification to the second device(s) 104. For example, the second device(s) 104 that receive the data representing the notification may be selected based at least in part on which device sensed the presence of the additional occupant, which device is designated as a personal device associated with the additional occupant, and/or hardware configurations of the devices. For example, if the notification includes audio data, the selected second device(s) 104 may be devices that include a speaker.

At block 218, the first device(s) 102 may send data indicating location of the additional subject(s) to the location component 136. For example, the additional occupant may move from his/her present location toward the area where the event occurred. The first device 102 may detect, utilizing the one or more sensors described herein, the location of the additional occupant and may send corresponding sensor data to the location component 136.

At block 220, the location component 126 may perform operations associated with locating the additional subject(s) and may send an indication that the additional subject(s) are near an area associated with the event to the command generator 134. For example, the location component 136 may determine when a location of the additional occupant satisfies a threshold distance from a location of the event and may send an indication that the additional occupant is near the event to the command generator 134. Alternatively, the first device(s) 102 may detect the presence of the additional occupant and may perform the location-related operations described above.

At block 222, the command generator 134 may determine an action to be performed, which may be based at least in part on the type of the additional subject(s) and/or the event type, for example. For example, the command generator 134 may determine one or more actions to be taken based at least in part on the additional occupant having moved to the area where the event occurred. The actions may include causing the first device 102 or another device to output audio and/or display images requesting confirmation that the event occurred, asking if help is needed, etc. Additional actions may include establishing a communication channel with another device, such as a device associated with emergency services.

At block 224, the command generator 134 may generate and send a command to perform the action to one or more devices, such as the first device 102.

At block 226, the command generator 134 may, in examples, send a request to establish a communication channel to a communications system 140. In examples where the action includes establishing a communication channel, the command generator 134 may send a request to establish a communication channel to the communications system 140.

At block 228, the communications system 140 may establish a communication channel with the first device 102 and one or more other devices. For example, the communications system 140 may determine the device identifier of the first device 102 as well as the device identifier of the device to which the communication channel is to be established and may utilize these device identifiers to establish the communication channel.

Figure 3:
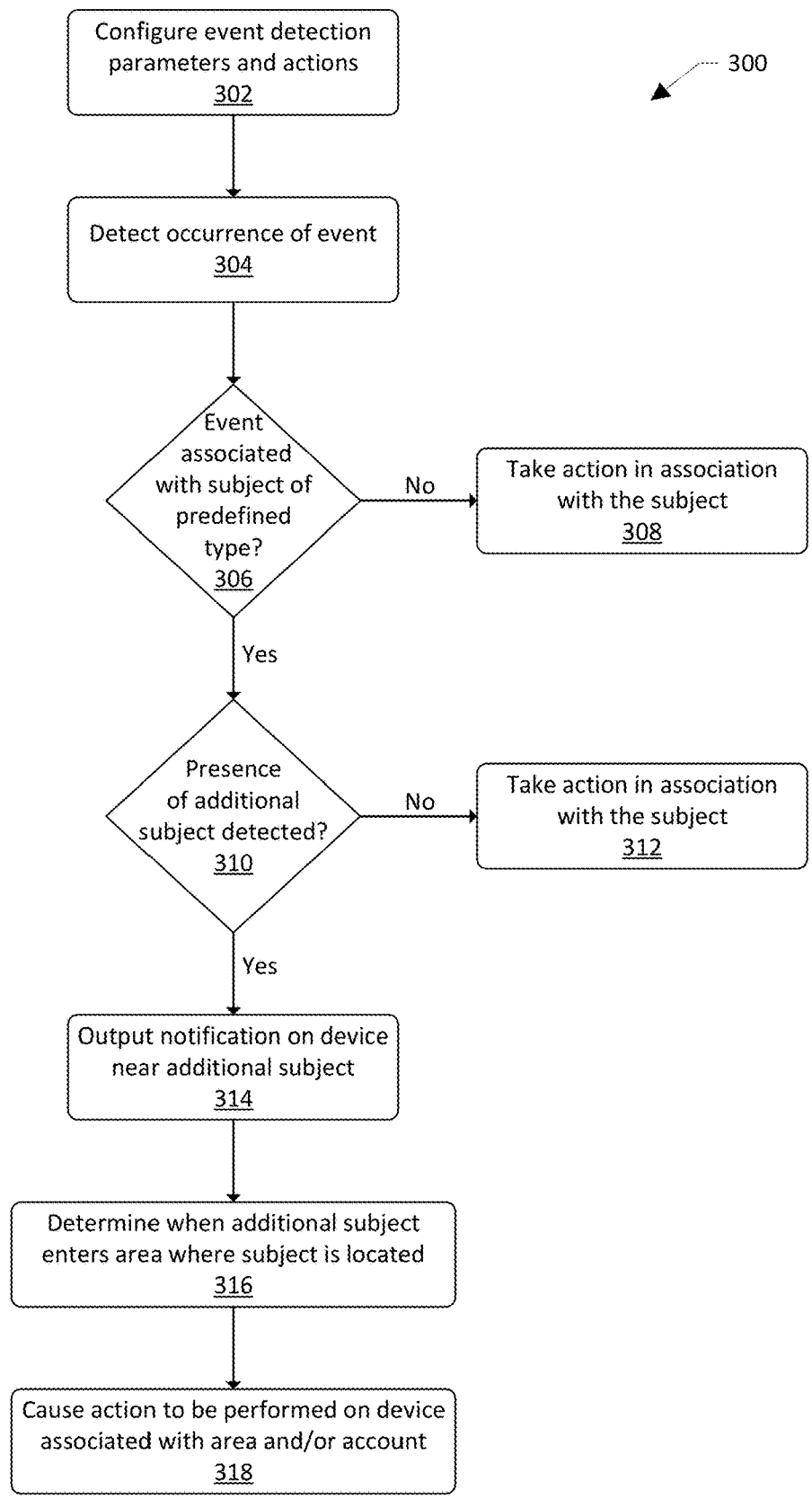
FIG. 3 illustrates a flow diagram of an example process for contextual response to motion-based events.

FIG. 3 illustrates processes for contextual response to motion-based events. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, subjects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 4-9, although the processes may be implemented in a wide variety of other environments, architectures and systems.

FIG. 3 illustrates a flow diagram of an example process 300 for contextual response to motion-based events. The order in which the operations or steps are described is not intended to be construed as a limitation, and any number of the described operations may be combined in any order and/or in parallel to implement process 300.

At block 302, the process 300 may include configuration event detection parameters and actions. For example, during a setup process, a system and/or one or more users may define various subject types, associate user profiles and/or information about users and/or subjects with subject types, associate notification types and/or modes with the types and/or event types, and/or associate actions for the system to take based on the types of the subject associated with the event and/or the types of additional occupants that are detected. The setup process may also include receiving user input indicating one or more devices and/or user profiles that may not be associated with users in the environment that may be utilized when an event is detected. For example, a user may indicate that a device associated with a neighbor should be notified of the event, such as in given circumstances where, for example, no "helper" subject is detected in the environment. Additional examples include establishing a communication channel with emergency personnel, with a device associated with a user profile of a "helper," etc. Configuration of notifications and actions taken when an event occurs may be performed utilizing user input and/or may be performed by the system, such as utilizing information about the devices and user profiles associated with given account data.

At block 304, the process 300 may include detecting occurrence of an event. For example, sensor data may be sent to components of a first device and/or to an event-detection component, which may determine whether one or more predefined events has occurred based at least in part on the sensor data. For example, one or more models may be configured to receive the sensor data as input and determine if one or more characteristics associated with the sensor data correspond to reference sensor data associated with the predefined event(s). By way of example, in the case of a user fall, the sensor data may indicate that the position of the user has changed quickly from a standing to a prone or otherwise horizontal position and/or to a kneeling position. By way of additional example, the sensor data may indicate a slouching motion of a user. Other examples may include pet detection and/or other subject detection. In these example, zones may be utilized to determine if an event has occurred. For example, a zone may be set to a certain portion of the environment, such as a countertop for detecting the presence of a pet that is positioned on the countertop. The zones may be set by a user and/or determined from an analysis of the environment at issue. In these examples, the event-detection component may analyze the sensor data with respect to reference data indicated to correspond to these and/or other events. When the event-detection component determines that the sensor data corresponds to the reference sensor data, such as above a threshold confidence, the event-detection component may generate event data indicating that the predefined event has occurred. The event data may be sent from the device to the remote system for processing.

At block 306, the process 300 may include determining whether the event is associated with a subject of a predefined class. For example, contextual information associated with the subject associated with the event as well as contextual information associated with other subjects in the environment may be determined. For example, a subject classifier may be configured to determine a type of the subject associated with the event. The subject classifier may utilize information provided by the device from which the sensor data was received, such as information indicating the size, shape, and/or identity of the subject to classify the subject into one or more predefined subject types. For example, one subject type may correspond to people that are less likely to be able to help themselves and may represent subjects with a size and/or shape that is likely to correspond to such a person. In certain examples, the information about the subject may be utilized to identify a user profile associated with the subject and that user profile may be utilized to classify the subject. In still other examples, additional information such as beacon data from a personal device associated with the subject may be utilized. For example, if the event is associated with a subject such as a person and that person has his/her personal device, the personal device may send data indicating that the personal device is present, such as by beaconing and/or short-range wireless connection, such as Bluetooth connection. The subject classifier may utilize some or all of this information to classify the subject associated with the event. If the subject is associated with a particular subject type, such as "non-helpers," the system may determine that instead of or in addition to attempting to interact with the person, such as by asking if the person needs help or to confirm that the event occurred, the system may determine that an additional occupant should be identified and notified of the event so that the additional occupant can lend aid.

If the subject is not associated with the predefined class, then at block 308 the process 300 may include taking an action associated with the subject. For example, when the predefined type indicates that the subject is a person that is capable of helping themselves, such as a helper, the action may include performing one or more confirmatory operations to determine that the event occurred. Those confirmatory operations may include performing AED operations as described herein and/or utilizing an NLU component to output audio requesting the user to confirm that the event occurred and asking if the person needs help.

If the subject is associated with the predefined class, then at block 310 the process 300 may include determining whether presence of one or more additional subjects is detected. For example, second device(s) may receive the command from the command generator and may initiate a process of detecting the presence of the other occupant. For example, the second device(s) may have already had sensors enabled and may have been actively generating sensor data. In these examples, receipt of the command may cause the sensor data to be sent to the remote system and/or may cause the second device(s) to determine whether the sensor data indicates that presence is detected. In other examples, the second device(s) may have already determined that presence was detected and may send an indication that presence was detected to the remote system. In still other examples, the sensors of the second device(s) may not have been enabled and the command may cause the sensors to enable and to start generating sensor data. In addition to sending an indication that presence of an occupant has been sensed, the second device(s) may send additional data associated with the detected presence. For example, the additional data may include an indication of the size, shape, type, and/or identification of the occupant. It should be understood that while examples used herein illustrate the detection of a single additional occupant, this disclosure includes the detection of multiple additional occupants and/or subjects associated with a given environment. It should also be understood that while "occupant" is used to infer that the other subject is alive, this disclosure also includes the identification of subjects that are not alive.

If presence of additional occupant(s) is not detected, then at block 312 the process 300 may include taking an action in association with the subject, which may include sending data representing a notification to a predefined device. For example, if no additional occupants are detected, the notification may be sent to a device associated with a parent user profile, a neighbor user profile, and/or a device associated with emergency services.

If presence of additional occupant(s) is detected, then at block 314 the process 300 may include causing output of the notification on a device near the additional subject(s). For example, the second device(s) that receive the data representing the notification may be selected based at least in part on which device sensed the presence of the additional occupant, which device is designated as a personal device associated with the additional occupant, and/or hardware configurations of the devices. For example, if the notification includes audio data, the selected second device(s) may be devices that include a speaker.

At block 316, the process 300 may include determining when the additional subject(s) enters an area where the subject associated with the event is located. For example, the additional occupant may move from his/her present location toward the area where the event occurred. The first device may detect, utilizing the one or more sensors described herein, the location of the additional occupant and may send corresponding sensor data to a location component. The location component may perform operations associated with locating the additional subject(s) and may send an indication that the additional subject(s) are near an area associated with the event to the command generator. For example, the location component may determine when a location of the additional occupant satisfies a threshold distance from a location of the event and may send an indication that the additional occupant is near the event to the command generator. Alternatively, the first device may detect the presence of the additional occupant and may perform the location-related operations described above.

At block 318, the process 300 may include causing an action to be performed on the device associated with the area and/or account. The action may include performing one or more of the confirmatory operations described herein, establishing a communication channel with another device, and/or assisting the additional occupant with providing aid.

Figure 4:
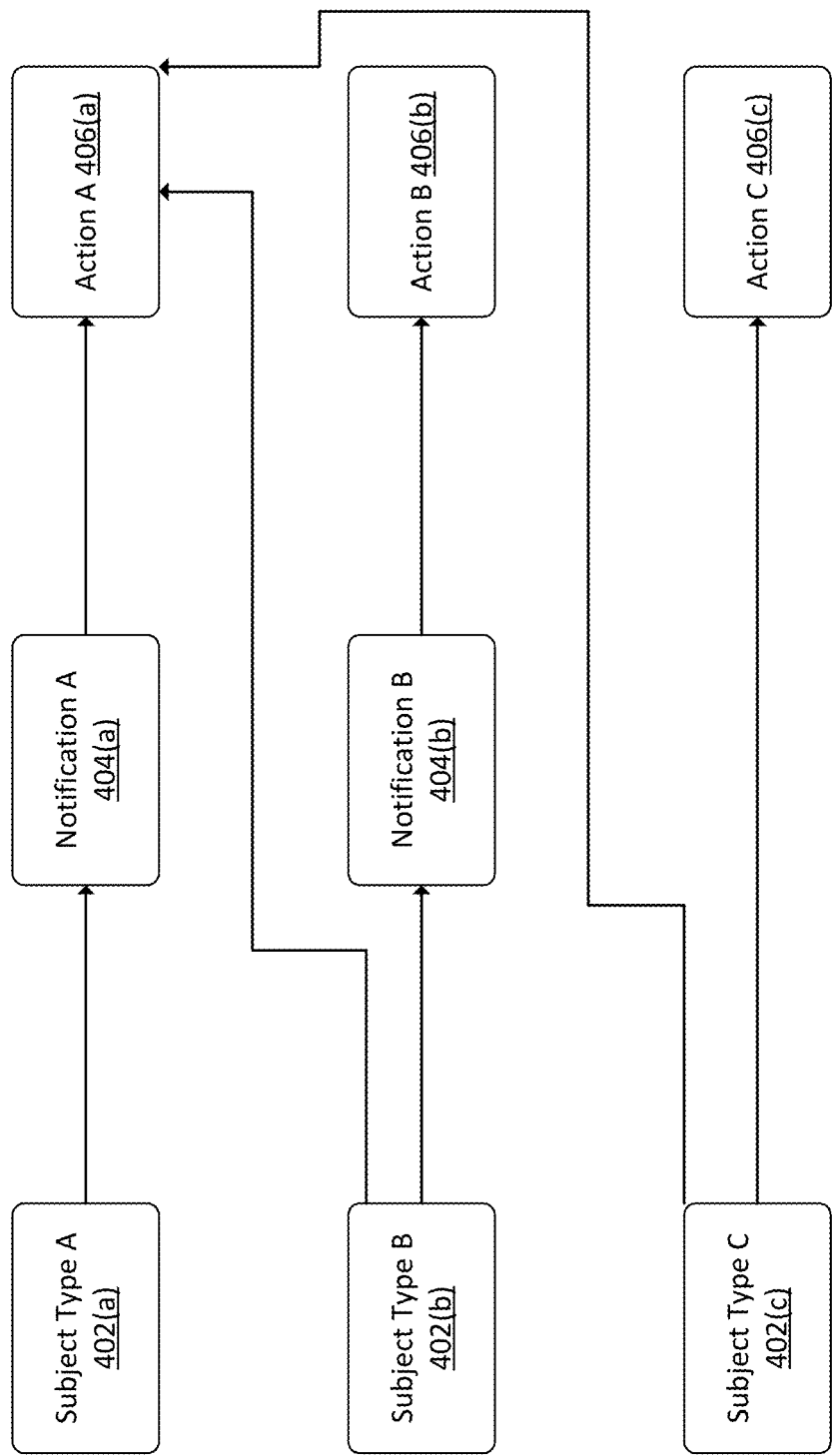
FIG. 4 illustrates a conceptual diagram of example notifications and actions taken in association with contextual response to motion-based events.

FIG. 4 illustrates a conceptual diagram of example notifications and actions taken in association with contextual response to motion-based events. As shown in FIG. 4, subjects detected based at least in part on determining that a predefined event has occurred may be classified and/or identified differently. For purposes of illustration, such subjects may be classified into three types, Subject Type A 402(a), Subject Type B 402(b), and Subject Type C 402(c). It should be understood that there may be one, two, three, or more than three types. For purposes of illustration, Subject Type A 402(a) may be associated with "helpers," Subject Type B 402(b) may be associated with "non-helpers," and Subject Type C 402(c) may be associated with other moving subjects like "pets." Determining type of subjects may be performed by a subject classifier as described elsewhere herein.

As shown in FIG. 4, when the subject is associated with the "helper" type, such as Subject Type A 402(a), a notification associated with that type may be generated and utilized, such as Notification A 404(a). Notification A 404(a) may indicate that the subject associated with the event needs assistance and may provide an indication of the type of event that was detected. Notification A 404(a) may also provide an indication of the location of the event and/or an identifier of the subject associated with the event. Once the subject of Subject Type A 402(a) is detected in the area associated with the event, one or more actions may be performed, such as Action A 406(a). Action A 406(a) may be selected from multiple actions based at least in part on the event type and/or the type of the subject as Subject Type A 402(a). Action A 406(a), for example, may be to perform confirmatory processes to confirm that the event occurred and to ask the subject if help is needed.

When the subject is associated with the "non-helper" type, such as Subject Type B 402(b), a notification associated with that type may be generated and utilized, such as Notification B 404(b). Notification B 404(b) may indicate that an event has occurred and may request that the person get the assistance of a helper. In these examples, because the person is not likely capable of providing medical assistance, the notification may request that the person attempt to find a person that can provide assistance. Additionally, if the person is detected in the area where the event occurred, Action B 406(b) may be selected, which may include asking whether help is needed and/or establishing a communication channel between a device associated with the area and another device, such as a device associated with a helper user profile. This may allow the person and the helper to speak and for the helper to provide guidance on how the person may assist. Additionally, Action A 406(*a*) may also be performed where emergency personnel are dispatched.

When the subject is associated with the "pet" type, such as Subject Type C 402(*c*), a notification may not be generated because the notification would not be useful to a subject associated with Subject Type C 402(*c*). Instead, Action C 406(*c*) may be performed, which may include contacting a device associated with a parent user profile and/or Action A 406(*a*) may be performed where emergency personnel are dispatched.

Figure 5C:
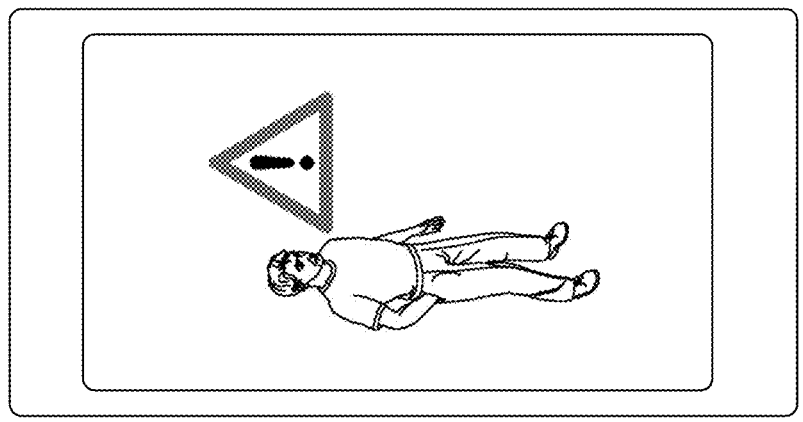
FIG. 5C illustrates an example user interface for providing a video feed of an environment in which an event is detected.
Figure 5B:
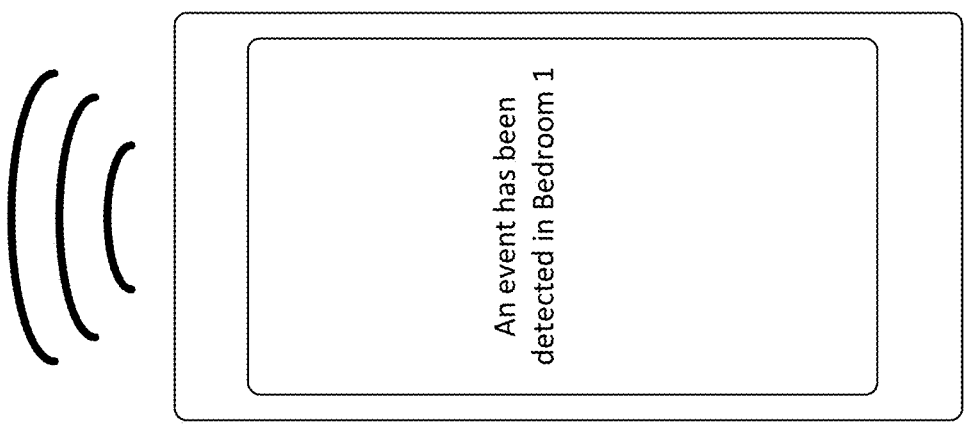
FIG. 5B illustrates an example user interface for outputting a notification in association with contextual response to motion-based events.
Figure 5A:
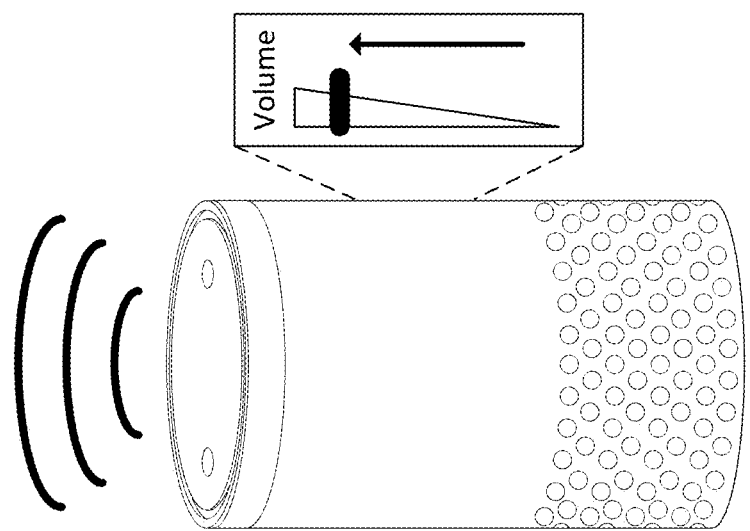
FIG. 5A illustrates an example electronic device utilized to output a notification and/or utilized to take an action in association with contextual response to motion-based events.

FIG. 5A illustrates an example electronic device utilized to output a notification and/or utilized to take an action in association with contextual response to motion-based events. For example, when a notification is to be output on the device(s), a command generator may generate a command to configure the device(s) for output of the notification. For example, the command may cause a volume level associated with the device(s) to increase, a lighting element to emit light, images being displayed to cease, an application to initiate that interrupts display of other information being viewed and/or that interrupts output of audio being currently output. Additional configurations may include causing one or more accessory devices, such as "smart home" devices to operate. An example of such operation would include causing smart light bulbs and/or plugs to turn lights on and off. Additionally, and particularly in circumstances where emergency services are called, the remote system may send a command that may cause one or more locks to unlock to allow emergency personnel to enter the environment, and/or a command that may cause smart lights or similar accessory devices to illuminate a path from an entryway to the area where the event occurred.

FIG. 5B illustrates an example user interface for outputting a notification in association with contextual response to motion-based events. For example, the notification illustrated in FIG. 5B may be utilized when the additional occupant that was detected is associated with a predefined subject type indicated to be capable of providing assistance to mitigate the detected event. The notification may include text data and/or audio data indicating the event, a location of the event, and/or an identifier of the subject associated with the event. Corresponding audio and/or text may be output on the device.

FIG. 5C illustrates an example user interface for providing a live or near-live video feed of an environment in which an event is detected. For example, when a first device that detected the event and/or a device located in the area where the event occurred is configured with a camera, the camera may be enabled to capture images and generate corresponding image data. The image data may be sent to a device associated with a person detected as discussed herein and/or to a device that has been predesigned to receive the image data and/or notification when events are detected. By so doing, the other person may view images corresponding to the event and a communication channel may be established that may allow the other person to communicate with the person associated with the event. These processes may also provide emergency personnel a visual indication of the area and the criticality of injuries, for example, associated with the event. In other examples, the image data may correspond to a recording instead of a live or near-live video feed. It should be understood that while a live, near-live, or recorded feed of image data may be provided, in other examples, a symbolic representation of the subject and the subject's location in relation to other portions of the area.

FIGS. 6 and 7 illustrate processes for contextual response to motion-based events. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, subjects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5, 8, and 9, although the processes may be implemented in a wide variety of other environments, architectures and systems.

FIG. 6 illustrates a flow diagram of an example process 600 for contextual response to motion-based events. The order in which the operations or steps are described is not intended to be construed as a limitation, and any number of the described operations may be combined in any order and/or in parallel to implement process 600.

At block 602, the process 600 may include determining, utilizing first data received from a first device, that a predefined event has occurred, the predefined event indicating that a first person has fallen, the first data indicating an environmental change as detected by a first sensor of the first device. For example, one or more models may be configured to receive the sensor data as input and determine if one or more characteristics associated with the sensor data correspond to reference sensor data associated with the predefined event(s). By way of example, in the case of a user fall, the sensor data may indicate that the position of the user has changed quickly from a standing to a prone or otherwise horizontal position and/or to a kneeling position. By way of additional example, the sensor data may indicate a slouching motion of a user. Other examples may include pet detection and/or other subject detection. In these example, zones may be utilized to determine if an event has occurred. For example, a zone may be set to a certain portion of the environment, such as a countertop for detecting the presence of a pet that is positioned on the countertop. The zones may be set by a user and/or determined from an analysis of the environment at issue. In these examples, the event-detection component may analyze the sensor data with respect to reference data indicated to correspond to these and/or other events. When the event-detection component determines that the sensor data corresponds to the reference sensor data, such as above a threshold confidence, the event-detection component may generate event data indicating that the predefined event has occurred. The event data may be sent from the device to the remote system for processing.

At block 604, the process 600 may include determining, utilizing second data received from the first device, that the first person is associated with a first user profile indicating the first person needs assistance when the predefined event occurs. In other examples, a first user profile may not be determined but a classification of the first person may occur. For example, a subject classifier may be configured to determine a type of the subject associated with the event. The subject classifier may utilize information provided by the device from which the sensor data was received, such as information indicating the size, shape, and/or identity of the subject to classify the subject into one or more predefined subject types. For example, one subject type may correspond to people that are less likely to be able to help themselves and may represent subjects with a size and/or shape that is likely to correspond to such a person. In certain examples, the information about the subject may be utilized to identify a user profile associated with the subject and that user profile may be utilized to classify the subject. In still other examples, additional information such as beacon data from a personal device associated with the subject may be utilized. For example, if the event is associated with a subject such as a person and that person has his/her personal device, the personal device may send data indicating that the personal device is present, such as by beaconing and/or short-range wireless connection, such as Bluetooth connection. The subject classifier may utilize some or all of this information to classify the subject associated with the event. If the subject is associated with a particular subject type, such as "non-helpers," the system may determine that instead of or in addition to attempting to interact with the person, such as by asking if the person needs help or to confirm that the event occurred, the system may determine that an additional occupant should be identified and notified of the event so that the additional occupant can lend aid.

At block 606, the process 600 may include determining, in response to determining that the first person is associated with the first predefined type of subjects and utilizing third data received from a second device, presence of a second person associated with an environment of the first person, the third data indicating that a second sensor of the second device detected a moving subject. For example, second device(s) may receive the command from the command generator and may initiate a process of detecting the presence of the other occupant. For example, the second device(s) may have already had sensors enabled and may have been actively generating sensor data. In these examples, receipt of the command may cause the sensor data to be sent to the remote system and/or may cause the second device(s) to determine whether the sensor data indicates that presence is detected. In other examples, the second device(s) may have already determined that presence was detected and may send an indication that presence was detected to the remote system. In still other examples, the sensors of the second device(s) may not have been enabled and the command may cause the sensors to enable and to start generating sensor data. In addition to sending an indication that presence of an occupant has been sensed, the second device(s) may send additional data associated with the detected presence. For example, the additional data may include an indication of the size, shape, type, and/or identification of the occupant. It should be understood that while examples used herein illustrate the detection of a single additional occupant, this disclosure includes the detection of multiple additional occupants and/or subjects associated with a given environment. It should also be understood that while "occupant" is used to infer that the other subject is alive, this disclosure also includes the identification of subjects that are not alive.

At block 608, the process 600 may include sending, to the second device and in response to determining the presence of the second person: fourth data representing a notification that the predefined event has occurred; and a first command to cause the second device to output the notification. For example, the second device(s) that receive the data representing the notification may be selected based at least in part on which device sensed the presence of the additional occupant, which device is designated as a personal device associated with the additional occupant, and/or hardware configurations of the devices. For example, if the notification includes audio data, the selected second device(s) may be devices that include a speaker.

Additionally, or alternatively, the process 600 may include determining, utilizing fifth data received from the first device, that the second person has moved to a first location that is within a threshold distance of a second location of the first person. The process 600 may also include determining, from the predefined event being of an event type, an action to be performed by the first device. The process 600 may also include sending, to the first device and in response to determining that the second person has moved to the first location, a second command to cause the first device to perform the action.

Additionally, or alternatively, the process 600 may include determining, utilizing the third data, that the second person is associated with a second user profile corresponding to individuals that have been identified as capable of providing assistance during the predefined event. The process 600 may also include selecting, in response to determining that the second person is associated with the second user profile, the notification from multiple notifications, individual ones of the multiple notifications associated with a given user profile. The process 600 may also include generating the fourth data in response to selecting the notification from the multiple notifications.

Additionally, or alternatively, the process 600 may include determining, utilizing the first data, a location of the first person. The process 600 may also include determining, from account data associated with the first device, a naming indicator associated with the location. The process 600 may also include generating, utilizing a natural language generator, the fourth data representing the notification, the notification including audio data that indicates the naming indicator. The process 600 may also include generating the first command such that the first command, when processed by the second device, causes the second device to output audio corresponding to the audio data.

FIG. 7 illustrates a flow diagram of another example process 700 for contextual response to motion-based events. The order in which the operations or steps are described is not intended to be construed as a limitation, and any number of the described operations may be combined in any order and/or in parallel to implement process 700.

At block 702, the process 700 may include determining, based at least in part on first data received from a first device, that a predefined event has occurred, the first data indicating an environmental change as detected by the first device. For example, one or more models may be configured to receive the sensor data as input and determine if one or more characteristics associated with the sensor data correspond to reference sensor data associated with the predefined event(s). By way of example, in the case of a user fall, the sensor data may indicate that the position of the user has changed quickly from a standing to a prone or otherwise horizontal position and/or to a kneeling position. By way of additional example, the sensor data may indicate a slouching motion of a user. Other examples may include pet detection and/or other subject detection. In these example, zones may be utilized to determine if an event has occurred. For example, a zone may be set to a certain portion of the environment, such as a countertop for detecting the presence of a pet that is positioned on the countertop. The zones may be set by a user and/or determined from an analysis of the environment at issue. In these examples, the event-detection component may analyze the sensor data with respect to reference data indicated to correspond to these and/or other events. When the event-detection component determines that the sensor data corresponds to the reference sensor data, such as above a threshold confidence, the event-detection component may generate event data indicating that the predefined event has occurred. The event data may be sent from the device to the remote system for processing.

At block 704, the process 700 may include determining, based at least in part on second data received from the first device, that a subject associated with the predefined event is associated with a first user profile indicating a user is to be contacted when the predefined event occurs. For example, a subject classifier may be configured to determine a type of the subject associated with the event. The subject classifier may utilize information provided by the device from which the sensor data was received, such as information indicating the size, shape, and/or identity of the subject to classify the subject into one or more predefined subject types. For example, one subject type may correspond to people that are less likely to be able to help themselves and may represent subjects with a size and/or shape that is likely to correspond to such a person. In certain examples, the information about the subject may be utilized to identify a user profile associated with the subject and that user profile may be utilized to classify the subject. In still other examples, additional information such as beacon data from a personal device associated with the subject may be utilized. For example, if the event is associated with a subject such as a person and that person has his/her personal device, the personal device may send data indicating that the personal device is present, such as by beaconing and/or short-range wireless connection, such as Bluetooth connection. The subject classifier may utilize some or all of this information to classify the subject associated with the event. If the subject is associated with a particular subject type, such as "non-helpers," the system may determine that instead of or in addition to attempting to interact with the person, such as by asking if the person needs help or to confirm that the event occurred, the system may determine that an additional occupant should be identified and notified of the event so that the additional occupant can lend aid.

At block 706, the process 700 may include determining, based at least in part on determining that the first subject is associated with the first user profile, presence of the user associated with an environment of the subject. For example, second device(s) may receive the command from the command generator and may initiate a process of detecting the presence of the other occupant. For example, the second device(s) may have already had sensors enabled and may have been actively generating sensor data. In these examples, receipt of the command may cause the sensor data to be sent to the remote system and/or may cause the second device(s) to determine whether the sensor data indicates that presence is detected. In other examples, the second device(s) may have already determined that presence was detected and may send an indication that presence was detected to the remote system. In still other examples, the sensors of the second device(s) may not have been enabled and the command may cause the sensors to enable and to start generating sensor data. In addition to sending an indication that presence of an occupant has been sensed, the second device(s) may send additional data associated with the detected presence. For example, the additional data may include an indication of the size, shape, type, and/or identification of the occupant. It should be understood that while examples used herein illustrate the detection of a single additional occupant, this disclosure includes the detection of multiple additional occupants and/or subjects associated with a given environment. It should also be understood that while "occupant" is used to infer that the other subject is alive, this disclosure also includes the identification of subjects that are not alive.

At block 708, the process 700 may include sending, to at least one of the user or a second device associated with the user and based at least in part on determining the presence of the user: third data representing a notification that the predefined event has occurred; and a first command to cause output of the notification. For example, the second device(s) that receive the data representing the notification may be selected based at least in part on which device sensed the presence of the additional occupant, which device is designated as a personal device associated with the additional occupant, and/or hardware configurations of the devices. For example, if the notification includes audio data, the selected second device(s) may be devices that include a speaker.

Additionally, or alternatively, the process 700 may include determining, based at least in part on fourth data received from the first device, that the second subject has moved to a first location that is within a threshold distance of a second location of the first subject. The process 700 may also include determining an action to be performed by at least one of the first device, the second device, or a third device associated with the first device. The process 700 may also include sending, to the at least one of the first device, the second device, or the third device, a second command to perform the action.

Additionally, or alternatively, the process 700 may include determining that the second subject is associated with a second user profile. The process 700 may also include selecting, based at least in part on determining that the second subject is associated with the second user profile, the notification from multiple notifications, individual ones of the multiple notifications associated with a given user profile. The process 700 may also include generating the third data based at least in part on selecting the notification from the multiple notifications.

Additionally, or alternatively, the process 700 may include determining a location of the first subject. The process 700 may also include determining, based at least in part on account data associated with the first device, a naming indicator associated with the location. The process 700 may also include generating the third data representing the notification, the notification including the naming indicator. In these examples, the first command may cause output of the notification including the naming indicator.

Additionally, or alternatively, the process 700 may include determining that the second subject is configured to wirelessly communicate with one or more electronic devices. The process 700 may also include generating the third data representing the notification, wherein in the notification includes a request to establish a communication channel between the second subject and the first device. The process 700 may also include causing the communication channel to be established between the second subject and the first device based at least in part on receiving input data representing a response to the request.

Additionally, or alternatively, the process 700 may include configuring the at least one of the second subject or the second device for output of the notification based at least in part on determining the presence of the second subject. In these examples, the configuring may include at least one of causing a volume setting to increase, causing a lighting element to emit light, or causing a display to present an image associated with at least one of the predefined event or the notification.

Additionally, or alternatively, the process 700 may include generating timing data associated with the predefined event, the timing data indicating a time at which the predefined event was determined to have started. The process 700 may also include generating the third data representing the notification, wherein the notification includes an indication of an amount of time that has lapsed between generation of the notification and the time indicated by the timing data. In these examples, causing output of the notification may include causing output of the indication of the amount of time that has lapsed.

Additionally, or alternatively, the process 700 may include determining that the second subject is associated with a second user profile. The process 700 may also include identifying, utilizing account data associated with the first device and based at least in part on determining that the second subject is associated with the second user profile, a third device predefined to receive event notifications. The process 700 may also include sending an instance of the third data representing the notification to the third device.

Figure 8:
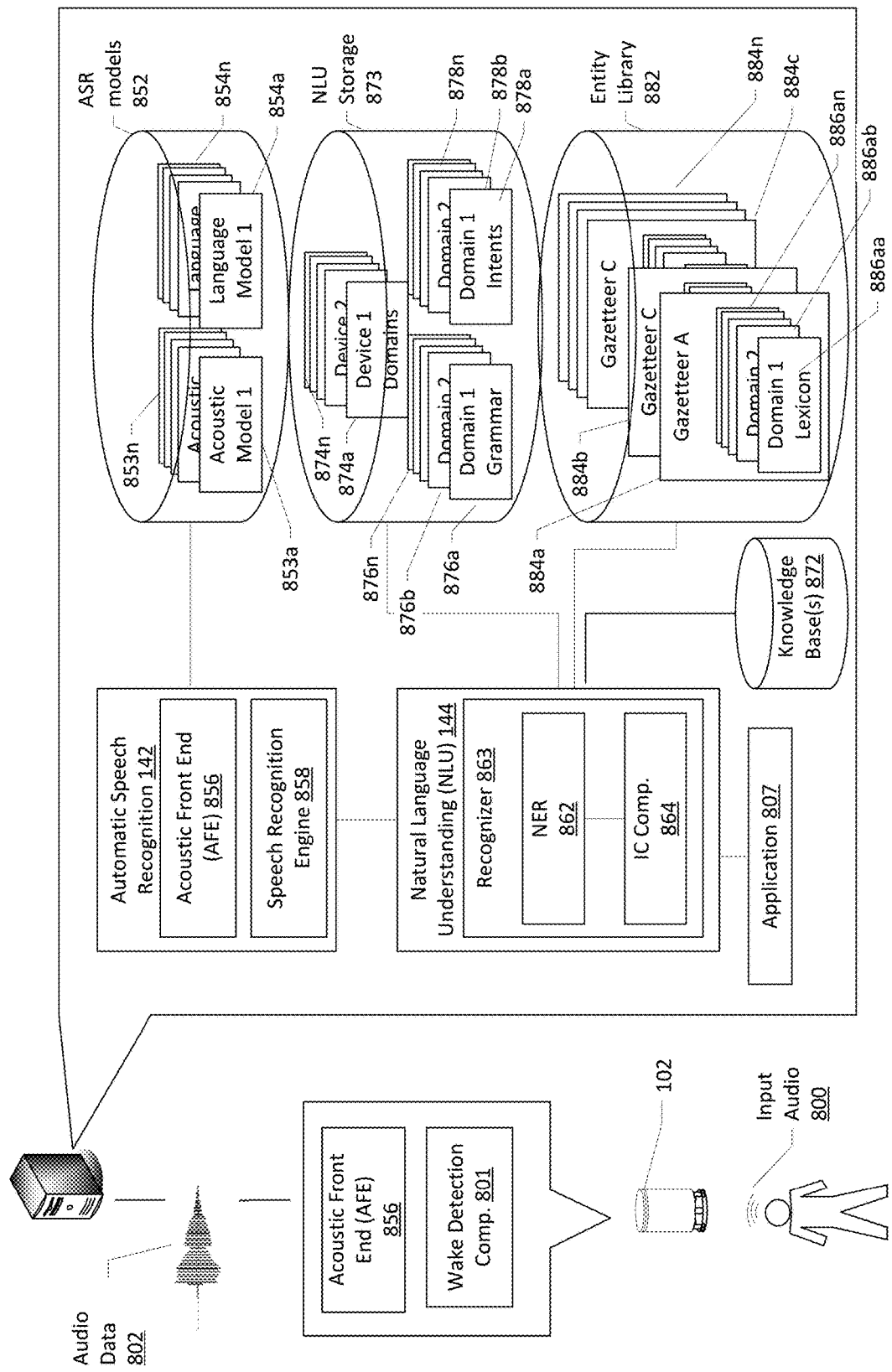
FIG. 8 illustrates a conceptual diagram of components of a speech-processing system for processing audio data provided by one or more devices.

FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 8 may occur directly or across a network 108. An audio capture component, such as a microphone 116 of the device 102, or another device, captures audio 800 corresponding to a spoken utterance. The device 102, using a wake-word component 801, then processes audio data corresponding to the audio 800 to determine if a keyword (such as a wakeword) is detected in the audio data. Following detection of a wakeword, the device 102 sends audio data 802 corresponding to the utterance to the remote system 106 that includes an ASR component 142. The audio data 802 may be output from an optional acoustic front end (AFE) 856 located on the device prior to transmission. In other instances, the audio data 802 may be in a different form for processing by a remote AFE 856, such as the AFE 856 located with the ASR component 142 of the remote system 106.

The wake-word component 801 works in conjunction with other components of the user device, for example a microphone to detect keywords in audio 800. For example, the device may convert audio 800 into audio data, and process the audio data with the wake-word component 801 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake-word component 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 802 corresponding to input audio 800 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 802 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR component 142 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 142 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856) and transmit that information to a server across a network for ASR processing. Feature vectors may arrive at the remote system 106 encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, call Rob?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 858 may identify, determine, and/or generate text data corresponding to the user utterance, here "call Rob."

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 144 (e.g., server 106) may include various components, including potentially dedicated processor(s), memory, storage, etc. As shown in FIG. 8, an NLU component 144 may include a recognizer 863 that includes a named entity recognition (NER) component 862 which is used to identify portions of query text that correspond to a named entity that may be recognizable by the system. A downstream process called named entity resolution links a text portion to a specific entity known to the system. To perform named entity resolution, the system may utilize gazetteer information (884a-884n) stored in entity library storage 882. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 142 based on the utterance input audio 800) and attempts to make a semantic interpretation of the text. That is, the NLU process determines the meaning behind the text based on the individual words and then implements that meaning. NLU processing 144 interprets a text string to derive an intent or a desired action from the user as well as the pertinent pieces of information in the text that allow a device (e.g., device 102) to complete that action. For example, if a spoken utterance is processed using ASR 142 and outputs the text "call for help" the NLU process may determine that the user intended to establish a communication channel and/or send a notification to a device for emergency services.

The NLU may process several textual inputs related to the same utterance. For example, if the ASR 142 outputs N text segments (as part of an N-best list), the NLU may process all N outputs to obtain NLU results.

As will be discussed further below, the NLU process may be configured to parse and tag to annotate text as part of NLU processing. For example, for the text "call Rob," "call" may be tagged as a command (to identify the title of a song) and "Rob" may be tagged as the naming identifier of the device to be called.

To correctly perform NLU processing of speech input, an NLU process 144 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 862 receives a query in the form of ASR results and attempts to identify relevant grammars and lexical information that may be used to construe meaning. To do so, the NLU component 144 may begin by identifying potential domains that may relate to the received query. The NLU storage 873 includes a database of devices (874*a*-874*n*) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 863, language model and/or grammar database (876*a*-876*n*), a particular set of intents/actions (878*a*-878*n*), and a particular personalized lexicon (886). Each gazetteer (884*a*-884*n*) may include domain-indexed lexical information associated with a particular user and/or device. For example, the Gazetteer A (884*a*) includes domain-index lexical information 886*aa* to 886*an*. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 864 parses the query to determine an intent or intents for each identified domain, where the intent corresponds to the action to be performed that is responsive to the query. Each domain is associated with a database (878*a*-878*n*) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 864 identifies potential intents for each identified domain by comparing words in the query to the words and phrases in the intents database 878. In some instances, the determination of an intent by the IC component 864 is performed using a set of rules or templates that are processed against the incoming text to identify a matching intent.

In order to generate a particular interpreted response, the NER 862 applies the grammar models and lexical information associated with the respective domain to actually recognize a mention of one or more entities in the text of the query. In this manner, the NER 862 identifies "slots" or values (i.e., particular words in query text) that may be needed for later command processing. Depending on the complexity of the NER 862, it may also label each slot with a type of varying levels of specificity (such as noun, place, device name, device location, city, artist name, song name, amount of time, timer number, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC component 864 are linked to domain-specific grammar frameworks (included in 876) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "call" is an identified intent, a grammar (876) framework or frameworks may correspond to sentence structures such as "call device with {Rob} identifier."

For example, the NER component 862 may parse the query to identify words as subject, object, verb, preposition, etc., based on grammar rules and/or models, prior to recognizing named entities. The identified verb may be used by the IC component 864 to identify intent, which is then used by the NER component 862 to identify frameworks. A framework for the intent of "play a song," meanwhile, may specify a list of slots/fields applicable to play the identified "song" and any object modifier (e.g., specifying a music collection from which the song should be accessed) or the like. The NER component 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 862 may search the database of generic words associated with the domain (in the knowledge base 872). So, for instance, if the query was "identify this song," after failing to determine which song is currently being output, the NER component 862 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to an application 807. The destination application 807 may be determined based on the NLU output. For example, if the NLU output includes a command to send a message, the destinated application 807 may be a message sending application, such as one located on the user device or in a message sending appliance, configured to execute a message sending command. If the NLU output includes a search request, the destination application 807 may include a search engine processor, such as one located on a search server, configured to execute a search command. After the appropriate command is generated based on the intent of the user, the application 807 may provide some or all of this information to a text-to-speech (TTS) engine. The TTS engine may then generate an actual audio file for outputting the audio data determined by the application 807 (e.g., "okay," or "connecting you to local authorities"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 144 during runtime operations where NLU operations are performed on text (such as text output from an ASR component 142). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC component 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 9:
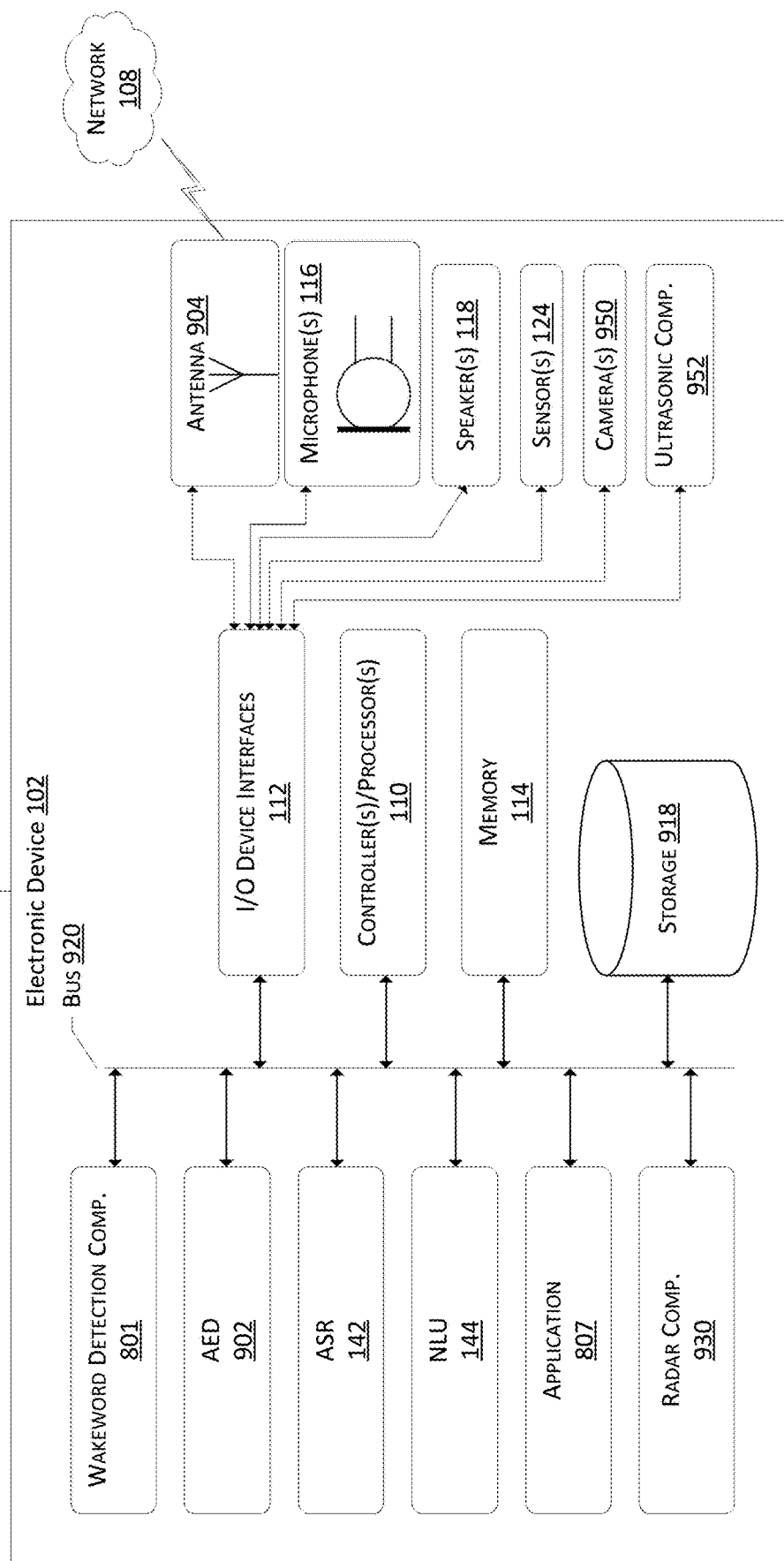
FIG. 9 illustrates a conceptual diagram of example components of an electronic device that may be utilized in association with contextual response to motion-based events.

FIG. 9 illustrates a conceptual diagram of example components of an electronic device 102 that may be utilized in association with configurations for contextual response to motion-based events. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 116, a power source, and functionality for sending generated audio data via one or more antennas 904 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 9 may include one or more controllers/processors 110, that may include a central processing unit (CPU) for processing data and computer-readable instructions, and memory 114 for storing data and instructions of the device 102. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as temporary "working" storage at runtime. A device's computer instructions may be stored in a non-transitory manner in non-volatile memory 114, storage 918, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 1020 for conveying data among components of the respective device. Each component within a device 102 may also be directly connected to other components in addition to, or instead of, being connected to other components across the bus 920.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 110 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 801, ASR component 142, etc.) may be configured to generate audio data corresponding to captured audio. The device 102 (using input/output device interfaces 112, antenna 904, etc.) may also be configured to transmit the audio data to the remote system 106 for further processing or to process the data using internal components such as a wakeword detection component 801.

Via the antenna(s) 904, the input/output device interface 112 may connect to one or more networks 108 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 108, the speech-processing system may be distributed across a networked environment. Accordingly, the device 102 and/or the remote system 106 may include an ASR component 142. The ASR component 142 of device 102 may be of limited or extended capabilities. The ASR component 142 may include language models stored in ASR model storage component, and an ASR component 142 that performs automatic speech recognition. If limited speech recognition is included, the ASR component 142 may be configured to identify a limited number of words, such as keywords detected by the device, whereas extended speech recognition may be configured to recognize a much larger range of words.

The device 102 and/or the remote system 106 may include a limited or extended NLU component 144. The NLU component 144 of device 102 may be of limited or extended capabilities. The NLU component 144 may comprise a name entity recognition module, an intent classification module and/or other components. The NLU component 144 may also include a stored knowledge base and/or entity library, or those storages may be separately located.

In examples, AED 902 may also be performed by the device 102. In these examples, the operations may include causing the AED component 902 to be enabled or otherwise turned on, or the operations may include causing the AED component 902 to transition from a first mode to a second mode representing a higher sensitivity to audio data generated by the microphone 116. The AED component 902 may utilize the audio data generated by the microphone 116 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a human body hitting a floor in the event of a fall may have a given audio fingerprint, a person expressing pain and/or disorientation may have another audio fingerprint, glass breaking may have yet another audio fingerprint, etc. The AED component 902 may receive an indication, such as from an event-detection component of the type of predefined event that has been detected and may utilize reference audio fingerprints associated with that event type for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 902 may determine that the audio fingerprint corresponds to at least one of the reference audio fingerprints, such as to a given confidence level, and may generate confirmatory data indicating that the audio fingerprint corresponds to the at least one reference audio fingerprint. The confirmatory data may be sent to a fusion component of the remote system for further processing.

The device 102 and/or the remote system 106 may also include an application 807 that is configured to execute commands/functions associated with a spoken command as described herein. The device 102 may include a wakeword detection component 801, which may be a separate component or may be included in an ASR component 142. The wakeword detection component 801 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

In examples, the device 102 and may not include speaker(s) 120 and may utilize speaker(s) of an external or peripheral device to output audio via the speaker(s) of the external/peripheral device. Additionally, the device 102 may include a radar component 930 having ultra-wide band radar and millimeter-wave radar. For example, antennas 904 may be configured to send and receive electromagnetic waves in radio and/or microwave domains. At least one of the antennas may be configured to send and receive electromagnetic waves having a bandwidth in the ultra-wide band range, such as a bandwidth at or around 6 GHz. At least one other of the antennas may be configured to send and receive electromagnetic waves having a bandwidth in the millimeter wave range, such as a bandwidth at or around 60 GHz. It should be understood that while the examples used herein describe one antenna associated with the ultra-wide band range and one antenna associated with the millimeter band range, each or either of these antennas may include multiple antennas and/or antenna arrays. The antennas may transmit the electromagnetic waves into the environment in which the device 102 is located and may receive the electromagnetic waves back at the device 102. The distortion and/or change in the electromagnetic waves as received by the device 102 may indicate motion and/or a change in position of one or more objects within the environment. The changes in motion that may be detected may include, for example, entry and/or exit of a user from the environment, location of the user relative to the device 102, number of users in the environment, an angle at which a user is positioned relative to the device 102, a posture of a user, movement of a user within the environment, a direction of travel of a user, a size of a user, etc.

The electromagnetic waves may be received by the antennas, which may generate corresponding audio data. The audio data may be sent to the event-detection component, which may determine whether one or more predefined events has occurred based at least in part on the audio data. For example, one or more models may be configured to receive the audio data as input and determine if one or more characteristics associated with the audio data correspond to reference audio data associated with the predefined event(s). By way of example, in the case of a user fall, the audio data may indicate that the position of the user has changed quickly from a standing to a prone or otherwise horizontal position and/or to a kneeling position. By way of additional example, the audio data may indicate a slouching motion of a user. In these examples, the event-detection component may analyze the audio data with respect to reference data indicated to correspond to these and/or other events. When the event-detection component determines that the audio data corresponds to the reference audio data, such as above a threshold confidence, the event-detection component may identify, determine, and/or generate event data indicating that the predefined event has occurred. The event data may be sent from the device 102 to the remote system 106 for processing.

To assist with the detection of acoustic events, for example, the device 102 may include one or more sensors 120 that may be configured to detect environmental changes. The sensors 120 may include, for example, radar, audio sensors such as the microphones 116, ultrasonic sensors, cameras 950, temperature sensors, motion sensors, light sensors, etc. The electronic device 102 may also include an ultrasonic component 952. The ultrasonic component 952 may include functionality that allows for sound waves in the ultrasonic frequency to be emitted and received for the detection of predefined events and/or the detection of subjects in an environment.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
determining, utilizing first data received from a first device, that a predefined event has occurred, the predefined event indicating that a first person has fallen, the first data indicating an environmental change as detected by a first sensor of the first device;
determining, utilizing second data received from the first device, that the first person is associated with a first user profile indicating the first person needs assistance when the predefined event occurs;
determining, in response to determining that the first person is associated with the first user profile and utilizing third data received from a second device, presence of a second person associated with an environment of the first person, the third data indicating that a second sensor of the second device detected a moving subject; and
sending, to the second device and in response to determining the presence of the second person:
fourth data representing a notification that the predefined event has occurred; and
a first command to cause the second device to output the notification.

2. The system of claim 1, the operations further comprising:
determining, utilizing fifth data received from the first device, that the second person has moved to a first location that is within a threshold distance of a second location of the first person;
determining, from the predefined event being of an event type, an action to be performed by the first device; and
sending, to the first device and in response to determining that the second person has moved to the first location, a second command to cause the first device to perform the action.

3. The system of claim 1, the operations further comprising:
determining, utilizing the third data, that the second person is associated with a second user profile indicating the second person has been identified as an assistance provider when the predefined event occurs;
selecting, in response to determining that the second person is associated with the second user profile, the notification from multiple notifications, individual ones of the multiple notifications associated with a given predefined user profile; and
generating the fourth data in response to selecting the notification from the multiple notifications.

4. The system of claim 1, the operations further comprising:
determining, utilizing the first data, a location of the first person;
determining, from account data associated with the first device, a naming indicator associated with the location;
generating, utilizing a natural language generator, the fourth data representing the notification, the notification including audio data that indicates the naming indicator; and
generating the first command such that the first command, when processed by the second device, causes the second device to output audio corresponding to the audio data.

5. A method, comprising:
determining, based at least in part on first data received from a first device, that a predefined event has occurred, the first data indicating an environmental change as detected by the first device;
determining, based at least in part on second data received from the first device, that a subject associated with the predefined event is associated with a first user profile indicating a user is to be contacted when the predefined event occurs;
determining, based at least in part on determining that the first subject is associated with the first user profile, presence of the user associated with an environment of the subject; and
sending, to a second device associated with the user and based at least in part on determining the presence of the user:
third data representing a notification that the predefined event has occurred; and
a first command to cause output of the notification.

6. The method of claim 5, further comprising:
determining, based at least in part on fourth data received from the first device, that the user has moved to a first location that is within a threshold distance of a second location of the subject;
determining an action to be performed by at least one of the first device, the second device, or a third device associated with the first device; and
sending, to the at least one of the first device, the second device, or the third device, a second command to perform the action.

7. The method of claim 5, further comprising:
determining that the user is associated with a second user profile;
selecting, based at least in part on determining that the user is associated with the second user profile, the notification from multiple notifications, individual ones of the multiple notifications associated with a given user profile; and
generating the third data based at least in part on selecting the notification from the multiple notifications.

8. The method of claim 5, further comprising:
determining a location of the subject;
determining, based at least in part on account data associated with the first device, a naming indicator associated with the location;
generating the third data representing the notification, the notification including the naming indicator; and
wherein the first command causes output of the notification including the naming indicator.

9. The method of claim 5, further comprising:
determining that the second device is configured to communicate with one or more electronic devices;
generating the third data representing the notification, wherein in the notification includes a request to establish a communication channel between the second device and the first device; and
causing the communication channel to be established between the second device and the first device based at least in part on receiving input data representing a response to the request.

10. The method of claim 5, further comprising, based at least in part on determining the presence of the user, configuring the second device for output of the notification.

11. The method of claim 5, further comprising:
generating timing data associated with the predefined event, the timing data indicating a time at which the predefined event was determined to have started;
generating the third data representing the notification, wherein the notification includes an indication of an amount of time that has lapsed between generation of the notification and the time indicated by the timing data; and
wherein causing output of the notification includes causing output of the indication of the amount of time that has lapsed.

12. The method of claim 5, further comprising:
determining that the user is associated with a second user profile;
identifying, utilizing account data associated with the first device and based at least in part on determining that the user is associated with the second user profile, a third device predefined to receive event notifications; and
sending an instance of the third data representing the notification to the third device.

13. A system, comprising:
one or more processors; and
non-transitory computer-readable media storing computer-executable instructions that, when executed by the one or more processors, cause the one or more processors to perform operations comprising:
determining, based at least in part on first data received from a first device, that a predefined event has occurred, the first data indicating an environmental change as detected by the first device;
determining, based at least in part on second data received from the first device, that a subject associated with the predefined event is associated with a first user profile indicating a user is to be contacted when the predefined event occurs;
determining, based at least in part on determining that the first subject is associated with the first user profile, presence of the user associated with an environment of the subject; and
sending, to a second device associated with the user and based at least in part on determining the presence of the user:
third data representing a notification that the predefined event has occurred; and
a first command to cause output of the notification.

14. The system of claim 13, the operations further comprising:
determining, based at least in part on fourth data received from the first device, that the user has moved to a first location that is within a threshold distance of a second location of the subject;
determining an action to be performed by at least one of the first device, the second device, or a third device associated with the first device; and
sending, to the at least one of the first device, the second device, or the third device, a second command to perform the action.

15. The system of claim 13, the operations further comprising:
determining that the user is associated with a second user profile;
selecting, based at least in part on determining that the user is associated with the second user profile, the notification from multiple notifications, individual ones of the multiple notifications associated with a given user profile; and
generating the third data based at least in part on selecting the notification from the multiple notifications.

16. The system of claim 13, the operations further comprising:
determining a location of the subject;
determining, based at least in part on account data associated with the first device, a naming indicator associated with the location;
generating the third data representing the notification, the notification including the naming indicator; and
wherein the first command causes output of the notification including the naming indicator.

17. The system of claim 13, the operations further comprising:
determining that the second device is configured to communicate with one or more electronic devices;
generating the third data representing the notification, wherein in the notification includes a request to establish a communication channel between the second device and the first device; and
causing the communication channel to be established between the second device and the first device based at least in part on receiving input data representing a response to the request.

18. The system of claim 13, the operations further comprising, based at least in part on determining the presence of the user, configuring the second device for output of the notification.

19. The system of claim 13, the operations further comprising:
generating timing data associated with the predefined event, the timing data indicating a time at which the predefined event was determined to have started;
generating the third data representing the notification, wherein the notification includes an indication of an amount of time that has lapsed between generation of the notification and the time indicated by the timing data; and
wherein causing output of the notification includes causing output of the indication of the amount of time that has lapsed.

20. The system of claim 13, the operations further comprising:
determining that the user is associated with a second user profile;
identifying, utilizing account data associated with the first device and based at least in part on determining that the user is associated with the second user profile, a third device predefined to receive event notifications; and
sending an instance of the third data representing the notification to the third device.

* * * * *